US011086525B2

United States Patent
Stabrawa et al.

(10) Patent No.: US 11,086,525 B2
(45) Date of Patent: Aug. 10, 2021

(54) RESILIENT EXTERNAL MEMORY

(71) Applicant: Kove IP, LLC, Chicago, IL (US)

(72) Inventors: Timothy A. Stabrawa, Lomband, IL (US); Zachary A. Cornelius, Chicago, IL (US); Andrew S. Poling, Lomband, IL (US); Jesse I. Taylor, Glenside, PA (US); John Overton, Chicago, IL (US)

(73) Assignee: KOVE IP, LLC, Chicago, IL (US)

( * ) Notice: Subject to any disclaimer, the term of this patent is extended or adjusted under 35 U.S.C. 154(b) by 0 days.

(21) Appl. No.: 16/050,974

(22) Filed: Jul. 31, 2018

(65) Prior Publication Data
US 2019/0042103 A1    Feb. 7, 2019

Related U.S. Application Data

(60) Provisional application No. 62/540,259, filed on Aug. 2, 2017.

(51) Int. Cl.
| | |
|---|---|
| *G06F 3/06* | (2006.01) |
| *G06F 12/10* | (2016.01) |
| *G06F 21/78* | (2013.01) |
| *G06F 11/10* | (2006.01) |

(52) U.S. Cl.
CPC ............ *G06F 3/0611* (2013.01); *G06F 3/065* (2013.01); *G06F 3/067* (2013.01); *G06F 3/0619* (2013.01); *G06F 3/0632* (2013.01); *G06F 11/10* (2013.01); *G06F 12/10* (2013.01); *G06F 21/78* (2013.01)

(58) Field of Classification Search
CPC ...... G06F 3/0611; G06F 3/067; G06F 3/0619; G06F 3/065; G06F 3/0632; G06F 11/10; G06F 21/78; G06F 12/10
See application file for complete search history.

(56) References Cited

U.S. PATENT DOCUMENTS

| | | |
|---|---|---|
| 6,049,853 A | 4/2000 | Kingsbury et al. |
| 7,925,711 B1 | 4/2011 | Gopalan et al. |
| 8,307,154 B2 | 11/2012 | Stabrawa et al. |
| (Continued) | | |

FOREIGN PATENT DOCUMENTS

WO    WO 2008/132760 A2    11/2008

OTHER PUBLICATIONS

Liran Liss, "On Demand Paging for User-level Networking," dated Sep. 30, 2013, pp. 1-25, Mellanox Technologies, Sunnyvale, CA.

(Continued)

*Primary Examiner* — Hiep T Nguyen
(74) *Attorney, Agent, or Firm* — Crowell & Moring LLP

(57) ABSTRACT

Methods and apparatuses may be provided, where data is written to a first region of memory on a first memory appliance in response to a write operation, the first region of memory is external memory to the client device, and the first region of memory is accessible by the client device over a network via client-side memory access in which a first communication interface of the first memory appliance is configured to access the first region of memory on the first memory appliance; and where the data of the write operation is caused to be written to a second region of memory on a second memory appliance, and wherein the data of the write operation is recoverable from a subset of the memory regions, the subset excluding the first region of memory or the second region of memory.

20 Claims, 15 Drawing Sheets

(56) References Cited

U.S. PATENT DOCUMENTS

| | | | |
|---|---|---|---|
| 8,510,524 B1* | 8/2013 | Corbett | G06F 3/067 711/162 |
| 8,745,276 B2 | 6/2014 | Bloch et al. | |
| 8,775,755 B2 | 7/2014 | Magenheimer et al. | |
| 8,799,914 B1 | 8/2014 | Metcalf | |
| 8,914,458 B2 | 12/2014 | Raindel et al. | |
| 9,015,426 B2 | 4/2015 | Stabrawa et al. | |
| 9,575,889 B2 | 2/2017 | Chang et al. | |
| 10,235,064 B1* | 3/2019 | Natanzon | G06F 3/0619 |
| 2003/0188114 A1 | 10/2003 | Lubbers et al. | |
| 2003/0188218 A1* | 10/2003 | Lubbers | G06F 11/2079 714/5.11 |
| 2004/0093389 A1 | 5/2004 | Mohammed et al. | |
| 2004/0143562 A1 | 7/2004 | Chen et al. | |
| 2004/0143718 A1 | 7/2004 | Chen et al. | |
| 2004/0221102 A1 | 11/2004 | Watanabe | |
| 2005/0044301 A1 | 2/2005 | Vasilevsky et al. | |
| 2005/0204045 A1 | 9/2005 | Belkin et al. | |
| 2005/0216552 A1 | 9/2005 | Fineberg et al. | |
| 2006/0236063 A1 | 10/2006 | Hausauer et al. | |
| 2008/0082593 A1* | 4/2008 | Komarov | G06F 11/1451 |
| 2008/0104337 A1 | 5/2008 | VelurEunni | |
| 2008/0235409 A1 | 9/2008 | Ryzhykh | |
| 2009/0113425 A1 | 4/2009 | Ports et al. | |
| 2010/0250867 A1* | 9/2010 | Bettger | G06F 16/176 711/152 |
| 2011/0264949 A1* | 10/2011 | Ikeuchi | G06F 11/1076 714/6.22 |
| 2012/0079318 A1* | 3/2012 | Colgrove | G06F 3/0689 714/6.22 |
| 2012/0221803 A1 | 8/2012 | Stabrawa et al. | |
| 2012/0222052 A1 | 8/2012 | Magenheimer et al. | |
| 2013/0185720 A1 | 7/2013 | Tuch et al. | |
| 2013/0290546 A1 | 10/2013 | Samih et al. | |
| 2014/0089451 A1 | 3/2014 | Eran et al. | |
| 2014/0164545 A1 | 6/2014 | Davis et al. | |
| 2015/0020071 A1 | 1/2015 | Phelan et al. | |
| 2015/0293881 A1 | 10/2015 | Raikin et al. | |
| 2015/0370494 A1* | 12/2015 | Wang | G06F 3/0619 711/114 |
| 2016/0019117 A1 | 1/2016 | Kumarasamy et al. | |
| 2016/0077761 A1* | 3/2016 | Stabrawa | G06F 3/0604 711/172 |
| 2016/0077966 A1 | 3/2016 | Stabrawa et al. | |
| 2016/0077975 A1 | 3/2016 | Stabrawa et al. | |
| 2017/0147227 A1 | 5/2017 | Stabrawa et al. | |
| 2017/0147437 A1* | 5/2017 | Borlick | G06F 11/1092 |
| 2017/0160979 A1* | 6/2017 | Golander | G06F 3/0619 |
| 2017/0192865 A1* | 7/2017 | Pan | G06F 12/023 |
| 2017/0285997 A1 | 10/2017 | Stabrawa et al. | |
| 2017/0286702 A1* | 10/2017 | Cheung | H04L 63/0853 |
| 2018/0081559 A1 | 3/2018 | Stabrawa et al. | |

OTHER PUBLICATIONS

Liran Liss, "On-Demand-Paging (ODP) Update," dated Apr. 28, 2014, available at https://www.youtube.com/watch?v=KbrlsXQbHCw.

Brian Van Essen et al., "DI-MMAP—a scalable memory-map runtime for out-of-core data-intensive applications," Cluster Computing, dated Oct. 4, 2013, pp. 15-28, vol. 18, Issue 1, published by Springer, New York City, NY.

Hannes Mühleisen et al., "Peak Performance—Remote Memory Revisited," dated Jun. 24, 2013, pp. 1-7, DaMoN' 13, New York, NY.

Kevin Te-Ming Lim, "Disaggregated Memory Architectures for Blade Servers," dated 2010, pp. 1-148, published by the University of Michigan, Ann Arbor, MI.

Shuang Liang et al. "Swapping to Remote Memory over Infiniband: An Approach using a High Performance Network Block Device," dated Sep. 2005, pp. 1-10, published by the Ohio State University, Columbus OH.

Shuang Liang et al. "Swapping to Remote Memory over Infiniband: An Approach using a High Performance Network Block Device," dated Sep. 2005, pp. 1-30, Cluster Computing, 2005, IEEE International, Conference located in Burlington, MA.

Stephen Mathew Rumble, "Memory and Object Management in RAMCloud," dated Mar. 2014, pp. 1-161, published by Stanford University, Stanford, CA.

Katnegermis, "rdma/rdma_common.c at master katnegermis/rdma," GitHub, dated Apr. 27, 2014, pp. 1-4, available at http://github.com/katnegermis/rdma/blob/master/rdma_common.c.

Katnegermis, rdma/rdma_server.c at master katnegermis/rdma, GitHub, dated May 6, 2014, pp. 1-7, available at http://github.com/katnegermis/rdma/blob/master/rdma_server.c.

Robert Russell, "Introduction to RDMA Programming", dated Apr. 17, 2014, pp. 1-76, available at http://web.archive.org/web/20140417205540/http://www.cs.unh.edu/~rdr/rdma-intro-module.ppt.

Anonymous, "Implementing calloc()," dated Apr. 12, 2010, pp. 1-3, published online by Lockless, available at URL http://web.archive.org/web/20100412183814/http://locklessinc.com/articles/calloc.

Konstantinos Karampogias, "An In-Memory RDMA-Based Architecture for the Hadoop Distributed Filesystem Master Thesis," dated Aug. 21, 2012, pp. 1-49, published by IBM Research—Zurich, Rüschlikon, Switzerland, available at ftp://ftp.tik.ee.ethz.ch/pub/students/2012-FS/MA-2012-04.pdf.

Anonymous, "Remote direct memory access," dated May 12, 2016, pp. 1-2, published online by Wikipedia at URL https://en.wikipedia.org/wiki/Remote_direct_memory_access.

Anonymous, "Copy-on-write," dated Nov. 26, 2014, pp. 1-3, Wikipedia, published by Wikipedia at URL: https://en.wikipedia.org/w/index.php?title=Copy-on-write&oldid=635508783.

Chao Wang et al., "NVMalloc: Exposing an Aggregate SSD as a Memory Partition in Extreme-Scale Machines", dated 2012, pp. 957-968, Parallel & Distributed Processing Symposium (IPDPS), 2012 IEEE 26th International, Shanghai, China.

"Hugetlbpage", dated Sep. 13, 2015, pp. 1-6, The Linux Kernel Archives, available at URL https://www.kernel.org/doc/Documentation/vm/hugetlbpage.txt.

Iulian Moraru, "nvmalloc", dated Feb. 27, 2013, p. 1, published online by GitHub at URL https://github.com/efficient/nvram/tree/master/nvmalloc.

Christoffer Dall, et al., "KVM/ARM: The Design and Implementation of the Linux Arm Hypervisor," dated Mar. 1, 2014, pp. 333-347, ASPLOS '14, Mar. 1-4, 2014, Salt Lake City, UT, Copyright is held by the owner/author(s). Publication rights licensed to ACM. ACM 971-1-4503-3205—May 14, 2003.

Avi Kivity et al., "kvm: the Linux Virtual Machine Monitor," dated Jun. 27, 2007, pp. 225-232, Proceedings of the Linux Symposium, vol. 1, published online by Kernel, Ottawa, Ontario, Canada.

Josh Triplett, "Using the KVM API," dated Sep. 29, 2015, pp. 1-12, published by LWN.net at URL https://lwn.net/Articles/658511.

Jes Sorensen, "KVM Live Snapshot support," dated Jun. 1, 2011, pp. 1-22, published by RedHat, LinuxCon, Japan.

"Warning: The xenpaging code is new and not fully debugged . . . ", p. 1, Retrieved from the Internet on Jan. 27, 2016, at URL: https://xenbits.xen.org/docs/4.3-testing/,misc/xenpaging.txt.

Brian Van Essen, "tagged_page.c" (source code file is part of DI-MMAP, Version 1.0), dated 2012, pp. 1-13, Lawrence Livermore National Security, LLC, retrieved from URL https://bitbucket.org/vanessen/di-mmap/src.

Brian Van Essen, "Snippet of 'tagged_page.c'" (source code file is part of DI-MMAP, Version 1.0), dated 2012, p. 1, Lawrence Livermore National Security, LLC, retrieved from URL https://bitbucket.org/vanessen/di-mmap/src.

Brian Van Essen, "helpers.c" (source code file is part of DI-MMAP, Version 1.0), dated 2012, pp. 1-19, Lawrence Livermore National Security, LLC, retrieved from URL https://bitbucket.org/vanessen/di-mmap/src.

Brian Van Essen, "Snippet of 'helpers.c'" (source code file is part of DI-MMAP, Version 1.0), dated 2012, p. 1, Lawrence Livermore National Security, LLC, retrieved from URL https://bitbucket.org/vanessen/di-mmap/src.

(56) References Cited

OTHER PUBLICATIONS

Anonymous, "Memory Resource Controller" (memory cgroup documentation—Kernel.org), dated Jan. 25, 2016, pp. 1-23, published by Kernel.org at URL https://www.kernel.org/doc/Documentation/cgroup-v1/memory.txt.
Ahmed Al-Moayed et al., "Quality of Service Attributes in Web Services," dated 2010, pp. 367-372, 2010 Fifth International Conference on Software Engineering Advances, © 2010 IEEE.
Aleksandar Dragojević al., FaRM: Fast Remote Memory, Proceedings of the 11th USENIX Symposium on Networked Systems Design and Implementation (NSDI '14), ISBN 978-1-931971-09-6, dated Apr. 2, 2014, pp. 1-15, published by USENIX Association, Seattle, WA.
International Search Report, issued in International Application No. PCT/US2015/050170, dated Dec. 8, 2015, pp. 1-14, European Patent Office, Rijswijk, Netherlands.
Partial International Search Report, issued in International Application No. PCT/US2015/050177, dated Dec. 17, 2015, pp. 1-8, European Patent Office, Rijswijk, Netherlands.
International Search Report, issued in International Application No. PCT/US2015/050177, dated May 4, 2016, pp. 1-28, European Patent Office, Rijswijk, Netherlands.
Non-Final Office Action, issued in U.S. Appl. No. 14/530,908, dated Apr. 8, 2016, pp. 1-21, United States Patent and Trademark Office, Alexandria, VA.
Non-Final Office Action, issued in U.S. Appl. No. 14/554,655, dated Apr. 6, 2016, pp. 1-22, United States Patent and Trademark Office, Alexandria, VA.
Non-Final Office Action, issued in U.S. Appl. No. 14/854,657, dated Oct. 23, 2017, pp. 1-12, United States Patent and Trademark Office, Alexandria, VA.
Final Office Action, issued in U.S. Appl. No. 14/530,908, dated Jul. 5, 2016, pp. 1-22, United States Patent and Trademark Office, Alexandria, VA.
Extended European Search Report, issued in European Patent Application No. 16162354.1, dated Jul. 28, 2016, pp. 1-11, European Patent Office, Munich, Germany.
Non-Final Office Action, issued in U.S. Appl. No. 15/621,537, dated Jun. 29, 2017, pp. 1-14, United States Patent and Trademark Office, Alexandria, VA.
Non-Final Office Action, issued in U.S. Appl. No. 14/554,655, dated Jan. 11, 2017, pp. 1-8, United States Patent and Trademark Office, Alexandria, VA.
Non-Final Office Action, issued in U.S. Appl. No. 15/800,891, dated Apr. 2, 2018, pp. 1-14, United States Patent and Trademark Office, Alexandria, VA.
Final Office Action, issued in U.S. Appl. No. 14/854,657, dated Apr. 5, 2018, pp. 1-13, United States Patent and Trademark Office, Alexandria, VA.
Non-Final Office Action, issued in U.S. Appl. No. 15/424,395, dated Apr. 2, 2018, pp. 1-17, United States Patent and Trademark Office, Alexandria, VA.
Final Office Action, issued in U.S. Appl. No. 15/424,395, dated Dec. 18, 2018, pp. 1-11, United States Patent and Trademark Office, Alexandria, VA.
Final Office Action, issued in U.S. Appl. No. 14/854,657, dated Aug. 24, 2018, pp. 1-6, United States Patent and Trademark Office, Alexandria, VA.
European Office Action, issued in European Application No. 15782105.9, dated Nov. 29, 2018, pp. 1-7, European Patent Office Rijswijk, Netherlands.
European Office Action, issued in European Application No. 15 770 761.3, dated Nov. 29, 2018, pp. 1-7, European Patent Office, Rijswijk, Netherlands.
Kevin Lim et al., "Disaggregated Memory for Expansion and Sharing in Blade Servers," International Symposium on Computer Architecture, dated Jun. 20, 2009, pp. 1-2, published by ACM, Austin, TX.
Final Office Action, issued in U.S. Appl. No. 15/800,891, dated Jul. 9, 2018, pp. 1-16, U.S. Patent and Trademark Office, Alexandria, VA.
Juncheng Gu et al., "Efficient Memory Disaggregation with Infiniswap," dated Mar. 2017, pp. 649-667, Proceedings of the $14^{th}$ USENIX Symposium on Networked Systems Design and Implementation (NSDI'17), published USENIX Association, Boston, MA, available at https://www.usenix.org/system/files/conference/nsdi17/nsdi17-gu-pdf.
Juncheng Gu et al., "Efficient Memory Disaggregation with Infiniswap," dated Mar. 2017, pp. 1-65, published by University of Michigan, Ann Arbor, MI, available at https://www.usenix.org/sites/default/files/conference/protected-files/nsdi17_slides_gu.pdf.
Juncheng Gu, "Efficient Memory Disaggregation with Infiniswap,"dated Mar. 2017, video, Proceedings of the $14^{th}$ USENIX Symposium on Networked Systems Design and Implementation (NSDI '17), published online by USENIX at https://www.usenix.org/conference/nsdi17/technical-sessions/presentation/gu and by YouTube at URL https://youtu.be/7zl2ls8nTos?t=6.
Extended European Search Report, issued in European Patent Application No. 20207722.8, dated Dec. 4, 2020, European Patent Office, Munich, Germany.
Andreas Hollmann et al., "Invasive Computing: An Application Assisted Resource Management Approach," Multicore Software Engineering, Performance, and Tools, dated May 31, 2012, pp. 82-85, published by Springer-Verlag, Berlin, Heidelberg.
Emmanuel Cecchet, "Memory Mapped Networks: a new deal for Distributed Shared Memories? The SciFS experience," ISBN 978-0-7695-1745-2, Cluster Computing, 2002, dated Sep. 23, 2002, pp. 231-238, 2002 IEEE International Conference, Piscataway, NJ.
Non-Final Office Action, issued in U.S. Appl. No. 16/395,329, dated Dec. 22, 2020, pp. 1-19, U.S. Patent and Trademark Office, Alexandria, VA.
Yukun Liu et al., "The Development Tutorial via UNIX Kernel Services," UNIX Operating System, online SBN 978-3-642-20432-6, dated 2011, pp. 1-368, published online by Springer Berlin Heidelberg at URL https://doi.0rg/10.1007/978-3-642-20432-6.

* cited by examiner

RESILIENT EXTERNAL MEMORY

BACKGROUND

1. Technical Field

This application relates to memory and, in particular, to external memory.

2. Related Art

When using external primary memory, a memory appliance may become a single point of failure.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Systems and methods are provided herein in which performance of client-side memory access may be made available while also achieving an improved level of data resiliency over some other systems.

Figure 1:
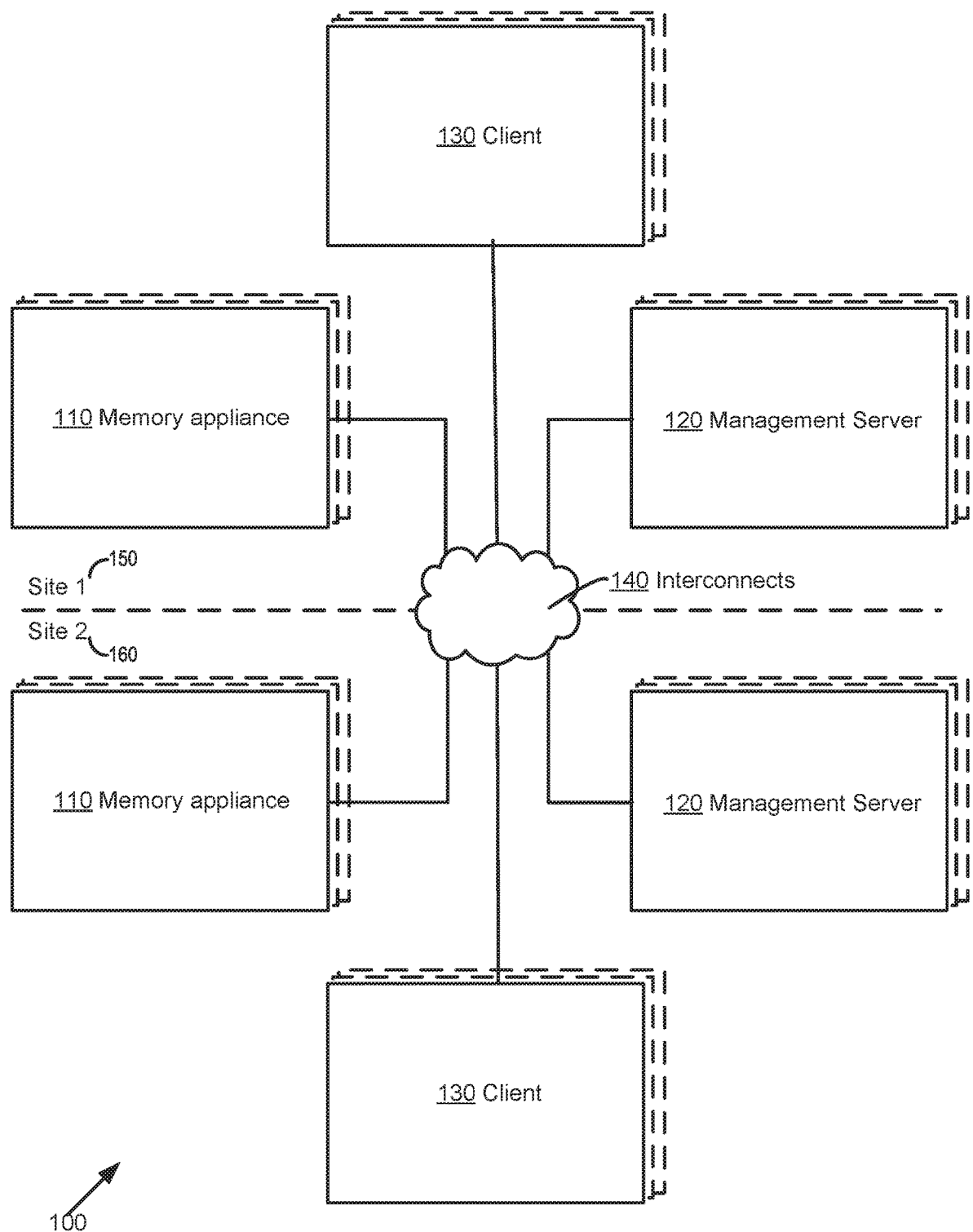
FIG. 1 illustrates a hardware diagram of an example resilient external memory system.

FIG. 1 illustrates a hardware diagram of an example resilient external memory system. The external memory system may include a memory appliance 110, a management server 120, a client 130, and one or more interconnects 140. The external memory system may include more, fewer, or different elements. For example, the external memory system may include multiple clients, multiple memory appliances, and/or multiple management servers. Alternatively, the external memory system may include just the client, just the memory appliance, and/or just the management server.

The memory appliance 110 may include memory that may be externally allocatable as primary memory. Henceforth, throughout this disclosure, unless specified otherwise, "memory" refers to primary memory. For example, external memory may also mean external primary memory. The management server 120 may be a memory pool manager, responsible to allocate and/or manipulate memory allocations for the client 130 using the memory appliance 110.

The client 130 may be a machine or a device requesting external memory. The client 130 may contain local memory that operates as the primary memory of the client 130. However, the external memory allocation may be requested by the client to scale the capacity of the primary memory available locally. Alternatively, or in addition, the client 130 may operate the locally available primary memory as a cache memory when accessing the externally allocated memory from the memory appliance 110. For example, cache memory may be used by the client to reduce average time to access data from the externally allocated memory. The locally available primary memory may be faster than the externally allocated memory and may be used to store copies of data from frequently used memory locations of the externally allocated memory. For example, the client may read data from or write data to a location in the externally allocated memory. The client may first check whether a copy of the data is in the cache memory, such as the locally available memory. If so, the client may read the data from or write the data to the cache memory, which may be faster than reading from or writing to the externally allocated memory.

The memory appliance 110, the management server 120, and the client 130 may communicate with each other over the interconnects 140. The communication may be unidirectional or bi-directional. The communication may be encrypted, unencrypted, and/or partially encrypted. Alternatively, or in addition, the communication may utilize data translation, as described elsewhere in this document. An interconnect may electrically couple the memory appliance 110, the management server 120, and/or the client 130. Each of the interconnects 140 may include a physical component that transports signals between two or more devices. For example, an interconnect may be a cable, a wire, a parallel bus, a serial bus, a network, a switched fabric, a wireless link, a point to point network, or any combination of components that transport signals between devices. Alternatively or in addition, the memory appliance 110, the management server 120, and the client 130 may communicate over a communication network, such as a switched fabric, a Storage Area Network (SAN), an InfiniBand network, a Local Area Network (LAN), a Wireless Local Area Network (WLAN), a Personal Area Network (PAN), a Wide Area Network (WAN), a circuit switched network, a packet switched network, a telecommunication network or any other now known or later developed communication network. The communication network, or simply "network", may enable a device to communicate with components of other external devices, unlike buses that only enable communication with components within and/or plugged into the device itself. Thus, a request for primary memory made by an application executing on the client 130 may be sent over the interconnect 140, such as the network. The request may be sent to devices external to the client 130, such as the management server 120 and/or the memory appliances 110.

In response to the request, the application that made the request may be allocated memory from memories of one or more memory appliances that are external to the client 130, instead of being allocated a portion of memory locally available inside the client 130 itself.

The management server 120 may dynamically allocate and/or manipulate external memory allocations for the client 130. An external memory allocation may reference one or more regions in the memory appliance 110. The management server 120 may allocate and/or manipulate the regions in the memory appliance 110 using region access logic requests. The client 130 may allocate and/or manipulate external memory allocations and/or regions using allocation logic requests.

Multiple memory appliances may be "pooled" to create a dynamically allocatable, or allocable, external memory pool. For example, new memory appliances may be discovered, or as they become available, memory of, or within, the new memory appliances may be made part of the memory pool. The memory pool may be a logical construct. The memory pool may be multiple memory appliances known to and/or associated with the management server 120. The memory appliances involved in the memory pool may not know about each other. As additional memory appliances are discovered, the memory of the memory appliances may be added to the memory pool, in other words, the portions of the memory of the memory appliances is made available for use by the requesting client 130. The client 130 may be able to request dynamically allocatable external memory from the memory pool which may be available for use, even though the external memory exists on other machines, unknown to the client 130. The client 130, requesting memory, at time of requesting the memory, may be unaware of the size of the memory pool or other characteristics related to configuration of the memory pool. The memory pool may increase or decrease at any time without a service interruption of any type to the memory consumers, such as the machines requesting memory.

The external memory allocations may span multiple memory appliances. Thus, the external memory system 100 makes available memory capacity, larger than what may be possible to fit into the requesting client 130, or a single memory appliance 110, or a single server. The memory capacity made available may be unlimited since any number of memory appliances may be part of the memory pool. The memory pool may be expanded based on various conditions being met. For example, the maximally price-performant memory available may be selected to grow the memory pool in a maximally cost-efficient manner. Alternatively, or in addition, memory appliances may be added at any moment to extend the capacity and performance of the aggregate pool, irrespective of characteristics of the memory appliances. In contrast, the individual client 130, such as a server computer, may be limited in physical and local memory capacity, and moreover, in order to achieve the largest memory capacity, expensive memory may have to be used or installed in the individual client 130 absent dynamically allocatable external memory.

Instead, with dynamically allocatable external memory, such as the memory pool, one no longer needs to buy expensive large servers with large memory capacity. One may instead buy smaller more energy-efficient and cost-effective servers and extend their memory capacity, on demand, by using dynamically allocatable external memory.

The memory pool may be managed by the management server 120. The management server 120, using various components, may provision external primary memory to the client 130 or multiple clients that request external memory allocation. The memory pool manager may provision external memory to different clients at different times according to different policies, contracts, service level agreements (SLAs), performance loads, temporary or permanent needs, or any other factors.

For example, the client 130 may be server cluster. By using external memory allocation and provisioning, the server cluster need not require servers to have sufficient pre-existing local memory in order to process all anticipated loads. A typical approach to have each individual server to have full capacity memory leads to over-purchasing memory for all servers in order to satisfy exceptional cases needed by some servers, some of the time. Instead, with external memory, the server cluster may provision portions of external memory where and when needed, thereby saving money, space, and energy, by providing on-demand memory to any capacity. The server cluster may even support memory capacities impossible to physically fit into a single machine.

In another example, external memory may be dynamically allocated according to performance ratings of the external memory. For example, higher-performance external memory may be provisioned for some purposes, and/or lower-performance, but larger capacity and/or lower cost, external memory for other purposes.

The memory pool may provide dynamic memory allocation so that the client 130 may request to receive external memory, and when the external memory is no longer needed, the client 130 may release the external memory back to the memory pool. The dynamic memory allocation may enable the client 130 to allocate a provisioned amount of external memory for various purposes on the client 130 at various times, on-the-fly, according to client-logic needs rather than based on an installation policy, or local, internal memory of a particular server.

The client 130 may access the dynamically allocatable external memory through a variety of methods. The different methods to access the external memory may vary the lowest level addressing used to address the external memory. The client 130 may be provided with different interfaces for each respective access method. For example, the access methods may provide physical mapping, programmatic APIs, or any other application-specific interface, to use the external memory so as to solve a multitude of diverse problems in optimal ways for every case. The different access methods may even be employed at the same time, and even against the same external memory allocation.

Depending upon the access method used, external memory operations may not be constrained to memory page size. For some access methods, external memory operations may be as small as a single byte or character and scale to any degree.

In an example, the dynamically allocatable external memory may enable multiple clients to share an external memory allocation. The multiple clients, in this case, may access and/or operate on the data in the shared external memory allocation at the same time. Thus, external and scalable shared memory may be provided to the multiple clients concurrently.

As described throughout this disclosure, external memory operations may be carried out via direct communication, referred to as a client-side memory access, between the client 130 and the memory appliance 110 that is part of the memory pool. The client-side memory access provides a consistent low latency, such as 2 micro-seconds. The client-side memory access also provides determinacy, or in other words a predictable performance, such as a determinate amount of time for a given memory operation to be performed. Thus, by using the client-side memory access, the dynamically allocatable external memory provides a high level of determinacy and consistent performance scaling even as more memory appliances and external memory clients are deployed and/or used for dynamic load balancing, aggregation, and/or re-aggregation.

Dynamically allocatable external memory may also be persistent, meaning the data stored in the external memory is durable over time. This extends the memory paradigm to include the persistence aspects of external storage while retaining the performance of memory. This provides performance of memory with conveniences of a storage paradigm.

Dynamically allocatable external memory may also be resilient, meaning the system is capable of continued operation and protection of data under various failure scenarios. For example, the data stored in the resilient external memory system 100 may be replicated in multiple memory appliances 110 at the same site 150 and/or multiple memory appliances 110 at different sites 160. A site may be a physical location containing one or more memory appliances 110 and optionally one or more clients 130 and/or management servers 120. The resilient external memory system 100 may replicate the data to the multiple memory appliances 110 in ways that achieve desired levels of data resiliency while preserving the performance advantages of client-side memory access.

Figure 2:
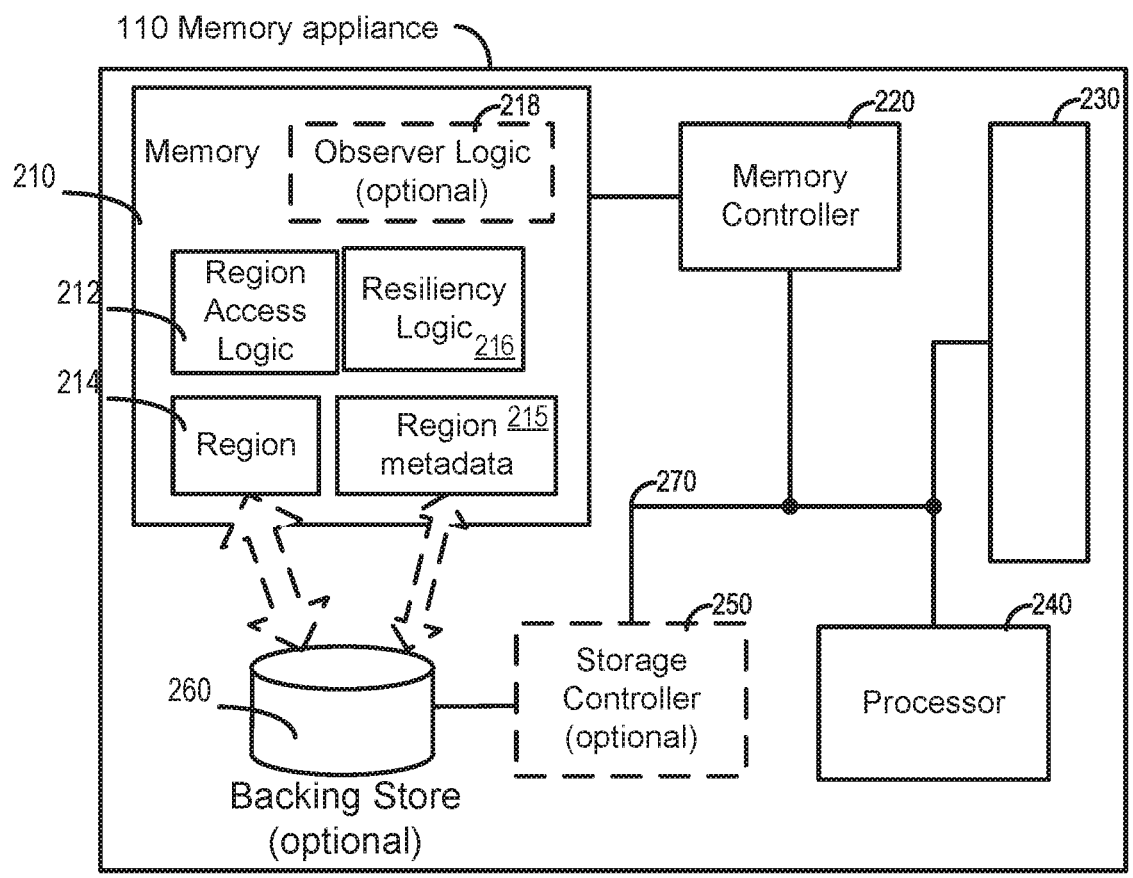
FIG. 2 illustrates an example memory appliance.

FIG. 2 illustrates the example memory appliance 110. By way of example, the system 100 for resilient external memory may store data of one or more regions in one or more memory appliances. The memory appliance 110 may be a server, a device, an embedded system, a circuit, a chipset, an integrated circuit, a field programmable gate array (FPGA), an application-specific integrated circuit, a virtual machine, an operating system, a kernel, a device driver, a device firmware, a hypervisor service, a cloud computing interface, and/or any other hardware, software, and/or firmware entity which may perform the same functions as described. The memory appliance 110 may include a memory 210, a memory controller 220, a communication interface 230, a processor 240, a storage controller 250, and a backing store 260. In other examples, the memory appliance may contain different elements. For example, in another example, the memory appliance 110 may not include the storage controller 250 and the backing store 260. The memory 210 may further include a region access logic 212, one or more regions 214, region metadata 215, an observer logic 218, and/or a resiliency logic 216. The observer logic 218 may not be present in other example memory 210. The region access logic 212 and/or the observer logic 218 may be referred to as a region access unit and/or a observer unit respectively. The memory appliance may include more, fewer, or different elements. For example, the memory appliance 110 may include multiple backing stores, multiple storage controllers, multiple memories, multiple memory controllers, multiple processors, or any combination thereof. The memory appliance 110 may store data received over the one or more interconnects 140.

The region access logic 212 in the memory appliance 110 may register the regions 214 or portions of the regions with one or more communication interfaces 230. Alternatively, or in addition, the region access logic 212 may provide and/or control access to the region 214 by one or more clients and/or one or more management servers. A communication interface in the client 130 may provide client-side memory access to the memory 210 of the memory appliance 110, to the regions 214, and/or to portions of the regions in the memory appliance 110. One or more interconnects or networks may transport data between the communication interface of the client 130 and the communication interface 230 of the memory appliance 110. For example, the communication interfaces may be network interface controllers or host controller adaptors.

A client-side memory access may bypass a processor, such as a CPU (Central Processing Unit), at the client 130 and/or may otherwise facilitate the client 130 accessing the memory 210 on the memory appliance 110 without waiting for an action by the processor included in the client 130, in the memory appliance, or both. Alternatively or in addition, a communication interface(s) 230 of the memory appliance 110 may be configured to access the memory 210 on the memory appliance 110. For example, the client-side memory access may be based on the Remote Direct Memory Access (RDMA) protocol. The RDMA protocol may be carried over an InfiniBand interconnect, an iWARP interconnect, an RDMA over Converged Ethernet (RoCE) interconnect, and/or any other interconnect and/or combination of interconnects known now or later discovered. Alternatively, or in addition, the client-side memory access may be based on any other protocol and/or interconnect that may be used for accessing memory. A protocol that may be used for accessing memory may be a CPU protocol/interconnect, such as HyperTransport and/or Quick Path Interconnect (QPI). Alternatively, or in addition, a protocol that may be used for accessing memory may be a peripheral protocol/interconnect, such as Peripheral Component Interconnect (PCI), PCI Express, PCI-X, ISA, and/or any other protocol/interconnect used to interface with peripherals and/or access memory. The communication interfaces may provide reliable delivery of messages and/or reliable execution of memory access operations, such as any memory access operation carried out when performing the client-side memory access. Alternatively, or in addition, delivery of messages and/or execution of memory access operations may be unreliable, such as when data is transported between the communication interfaces using the User Datagram Protocol (UDP). The client 130 may read, write, and/or perform other operations on the memory 210, to the regions 214 within the memory 210, and/or to portions of the regions using client-side memory access. In providing client-side memory access, the client 130 may transmit requests to perform memory access operations to the memory appliance 110. In response, the memory appliance 110 may perform the memory access operations. Similar to as done by the storage device of U.S. patent application Ser. No. 13/036,544, filed Feb. 28, 2011, entitled "High performance data storage using observable client-side memory access" by Stabrawa, et al., which published as US Patent Application Publication US2012/0221803 A1, and which is hereby incorporated by reference, the memory appliance 110 may observe or otherwise identify the memory access operations. In response to identifying the memory access operations, the memory appliance 110 may, for example, copy the data of the region 214 to one or more backing stores 260 independently of performing the memory access operations on the memory 210. A backing store 260 may include one or more persistent non-volatile storage media, such as flash memory, phase change memory, 3D XPoint memory, memristors, EEPROM, magnetic disk, tape, or some other media. The memory 210 and/or the backing store 260 (if included) may be subdivided into regions.

The memory appliance may be powered by a single power source, or by multiple power sources. Examples of the power source include a public utility, internal or external battery, an Uninterruptible Power Supply (UPS), a facility UPS, a generator, a solar panel, any other power source, or a combination of power sources. The memory appliance may detect the condition of the one or more power sources that power the storage device.

The memory 210 may be any memory or combination of memories, such as a solid state memory, a random access memory (RAM), a dynamic random access memory (DRAM), a static random access memory (SRAM), a flash memory, a read-only memory (ROM), an electrically erasable programmable read-only memory (EEPROM), a phase change memory, 3D XPoint memory, a memristor memory, any type of memory configured in an address space addressable by the processor, or any combination thereof. The memory 210 may be volatile or non-volatile, or a combination of both.

The memory 210 may be a solid state memory. Solid state memory may include a device, or a combination of devices, that stores data, is constructed primarily from electrical conductors, semiconductors and insulators, and is considered not to have any moving mechanical parts. Solid state memory may be byte-addressable, word-addressable or block-addressable. For example, most dynamic RAM and some flash RAM may be byte-addressable or word-addressable. Flash RAM and other persistent types of RAM may be block-addressable. Solid state memory may be designed to connect to a memory controller, such as the memory controller 220 in the memory appliance 110, via an interconnect bus, such as the interconnect 270 in the memory appliance 110.

Solid state memory may include random access memory that permits stored data to be read and/or written in any order (for example, at random). The term "random" refers to the fact that any piece of data may be returned and/or written within a constant time period, regardless of the physical location of the data and regardless of whether the data is related to a previously read or written piece of data. In contrast, storage devices such as magnetic or optical discs rely on the physical movement of the recording medium or a read/write head so that retrieval time varies based on the physical location of the next item read and write time varies based on the physical location of the next item written. Examples of solid state memory include, but are not limited to: DRAM, SRAM, NAND flash RAM, NOR flash RAM, phase change memory (PRAM), 3D XPoint memory, EEPROM, FeRAM, MRAM, CBRAM, PRAM, SONOS, RRAM, Racetrack memory, NRAM, Millipede, T-RAM, Z-Ram, and TTRAM.

In contrast to solid state memory, solid state storage devices are systems or devices that package solid state memory with a specialized storage controller through which the packaged solid state memory may be accessed using a hardware interconnect that conforms to a standardized storage hardware interface. For example, solid state storage devices include, but are not limited to: flash memory drives that include Serial Advanced Technology Attachment (SATA) or Small Computer System Interface (SCSI) interfaces; Flash or DRAM drives that include SCSI over Fibre Channel interfaces; DRAM, Flash, and/or 3D XPoint memory drives that include NVMe interfaces; DRAM drives that include SATA or SCSI interfaces; and USB (universal serial bus) flash drives with USB interfaces.

The memory 210 may include the region access logic 212, the region 214, and the region metadata 215. In an example, each portion of the memory 210 that includes a corresponding one of the region access logic 212, the region 214, and the region metadata 215 may be of a different type than the other portions of the memory 210. For example, the memory 210 may include a ROM and a solid state memory, where the ROM includes the region access logic 212, and the solid state memory includes the region 214 and the region metadata 215. The memory 210 may be controlled by the memory controller 220. The memory 210 may include more, fewer, or different components. For example, the memory may include the observer logic 218.

The processor 240 may be a general processor, a central processing unit (CPU), a server, a microcontroller, an application specific integrated circuit (ASIC), a digital signal processor, a field programmable gate array (FPGA), a digital circuit, an analog circuit, or any combination thereof. The processor 240 may include one or more devices operable to execute computer executable instructions or computer code embodied in the memory 210 or in other memory to perform features of the external memory system. For example, the processor 240 may execute computer executable instructions that are included in the resiliency logic 216, the observer logic 218, and/or the region access logic 212.

The processor 240, the memory controller 220, and the one or more communication interfaces 230 may each be in communication with each other. Each one of the processor 240, the memory controller 220, and the one or more communication interfaces 230 may also be in communication with additional components, such as the storage controller 250, and the backing store 260. The communication between the components of the memory appliance 110 may be over an interconnect, a bus, a point-to-point connection, a switched fabric, a network, any other type of interconnect, or any combination of interconnects 270. The communication may use any type of topology, including but not limited to a star, a mesh, a hypercube, a ring, a torus, or any other type of topology known now or later discovered. Alternatively or in addition, any of the processor 240, the memory 210, the memory controller 220, and/or the communication interface 230 may be logically or physically combined with each other or with other components, such as with the storage controller 250, and/or the backing store 260.

The memory controller 220 may include a hardware component that translates memory addresses specified by the processor 240 into the appropriate signaling to access corresponding locations in the memory 210. The processor 240 may specify the address on the interconnect 270. The processor 240, the interconnect 270, and the memory 210 may be directly or indirectly coupled to a common circuit board, such as a motherboard. In one example, the interconnect 270 may include an address bus that is used to specify a physical address, where the address bus includes a series of lines connecting two or more components. The memory controller 220 may, for example, also perform background processing tasks, such as periodically refreshing the contents of the memory 210. In one example implementation, the memory controller 220 may be included in the processor 240.

The one or more communication interfaces 230 may include any one or more physical interconnects used for data transfer. In particular, the one or more communication interfaces 230 may facilitate communication between the memory appliance 110 and the client 130, between the memory appliance 110 and the management server 120, between the memory appliance 110 and any other device, and/or between the management server 120 and any other device. The one or more communication interfaces 230 may communicate via the one or more interconnects. The one or more communication interfaces 230 may include a hardware component. In addition, the one or more communication interfaces 230 may include a software component. Examples of the communication interface include a Direct Memory Access (DMA) controller, an RDMA controller, a Network Interface Controller (NIC), an Ethernet controller, a Fibre Channel interface, an InfiniBand interface, a SATA interface, a SCSI interface, a USB interface, an Ethernet interface, or any other physical communication interface. The one or more communication interfaces 230 may facilitate client-side memory access, as described throughout this disclosure.

The region 214 may be a configured area of the memory 210 that is accessible via a memory access protocol and/or storage protocol now known or later discovered. Storage protocols and memory access protocols are described elsewhere in this disclosure. The region 214 may be a logical region which maps a sequence of data blocks to corresponding memory locations in the memory 210. Therefore, in addition to the data blocks themselves, the region 214 may include region information, such as a mapping of data blocks to memory locations or any other information about the data blocks. The data blocks of the region 214, which may be configured by the region access logic 212, may all be stored in the memory 210. The volume information may or may not be included in the memory 210. Accordingly, when the region 214 is said to be included in the memory 210, at least the data blocks of the region 214 (the data stored in the region) are included in the memory 210. Alternatively, or in addition, the volume information may be included in the region metadata 215.

The region metadata 215 may include properties, configuration parameters, and/or access parameters related to the region 214.

Properties may include the size of the region, references to portions within the memory allocated to the region 214, and/or any other aspects describing the region 214, its data, its memory, and/or its backing store.

Configuration parameters may include an indication of whether or not the region 214 may be persisted to the backing store 260, an indication of what method may be used to persist the region 214 to the backing store 260, an identifier which may be used to locate persisted data related to the region 214, and/or any other parameters used to specify how the region 214 may behave or be treated.

Access parameters may include a list of zero or more communication interfaces 230 included in the memory appliance 110 which may be used to access the region 214, a list of zero or more clients, memory appliances, and/or management servers which are allowed to access the region 214, a list of zero or more communication interfaces of clients, memory appliances, and/or management servers which are allowed to access the region 214, a password which may be used to authenticate access to the region 214, an encryption key which may be used to authenticate access to the region 214, access permissions, and/or any other parameters used to specify how the region may be accessed.

Access permissions may include a mapping of access method to permissions granted and/or revoked. Access methods may include: via a specified communication interface 230 included in the memory appliance 110; via a specified communication interface of a client, memory appliance, and/or management server; by a specified client; by a specified memory appliance; by a specified management server; using a specified password; using a specified encryption key; and/or any other identifiable method used to access the region.

Permissions may include data read access, data write access, metadata read access, metadata write access, destroy access, and/or any other capability that may be selectively granted and/or revoked to a client, a memory appliance, and/or a management server. For example, the access parameters may include access permissions that indicate that a particular management server may read the metadata for the region 214, but may not read and/or write the data of the region 214. In a second example, the access parameters may include access permissions that indicate that a particular client may read the data for the region 214, but may not write the data for the region 214.

The storage controller 250 of the memory appliance 110, of the management server 120, and/or of the client 130 may include a component that facilitates storage operations to be performed on the backing store 260. A storage operation may include reading from or writing to locations within the backing store 260. The storage controller 250 may include a hardware component. Alternatively or in addition, the storage controller 250 may include a software component.

The backing store 260 of the memory appliance 110, of the management server 120, and/or of the client 130 may include an area of storage comprising one or more persistent media, including but not limited to flash memory, phase change memory, 3D XPoint memory, Memristors, EEPROM, magnetic disk, tape, or other media. The media in the backing store 260 may potentially be slower than the memory 210 on which the region 214 is stored.

The storage controller 250 and/or backing store 260 of the memory appliance 110 may be internal to the memory appliance 110, a physically discrete component external to the memory appliance 110 and coupled to the backing store 260, included in a second memory appliance or in a device different from the memory appliance 110, included in the management server 120, included in the client 130, part of a server, part of a backup device, part of a storage device on a Storage Area Network, and/or part of some other externally attached persistent storage. Alternatively, or in addition, a region included in a different memory appliance may be used as the backing store for the memory appliance 110.

Figure 3:
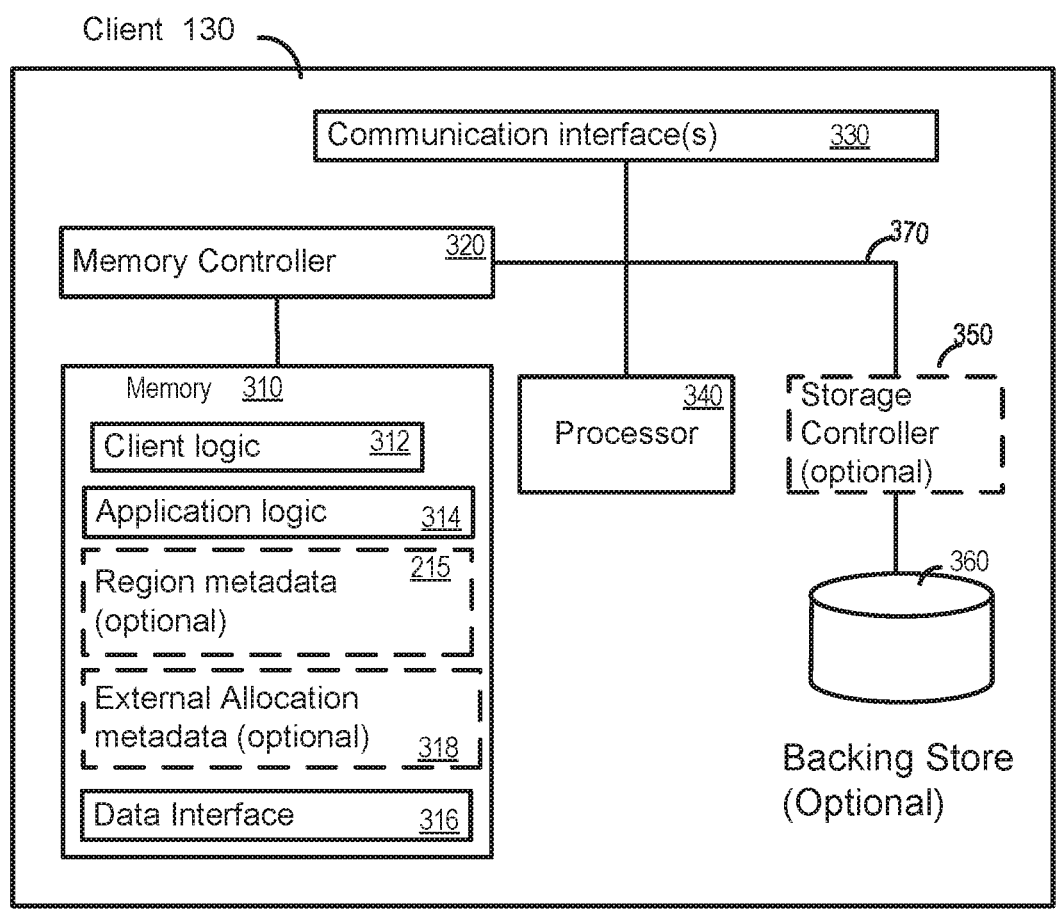
FIG. 3 illustrates an example client.

FIG. 3 illustrates the example client 130. The client 130 may include a memory 310, a memory controller 320, a processor 340, and a communication interface 330, similar to the memory 210, the processor 240, the communication interface 230, and the memory controller 220 of the memory appliance 110. The client 130 may include more, fewer, or different components. For example, the client 130 may include a storage controller 350, a backing store 360, multiple storage controllers, multiple backing stores, multiple memories, multiple memory controllers, multiple processors, or any combination thereof. Alternatively, the client 130 may just include a process executed by the processor 340.

The storage controller 350 and/or backing store 360 of the client 130 may be internal to the client 130, a physically discrete device external to the client 130 that is coupled to the client 130, included in a second client or in a device different from the client 130, included in the management server 120, included in the memory appliance 110, part of a server, part of a backup device, part of a storage device on a Storage Area Network, and/or part of some other externally attached persistent storage. Alternatively, or in addition, the region 214 included in the memory appliance 110 may be used as the backing store 360 for the client 130.

The memory 310 of the client 130 may include a client logic 312. The memory 310 of the client 130 may include more, fewer, or different components. For example, the memory 310 of the client 130 may include an application logic 314, the region metadata 215, a data interface 316, and/or external memory allocation metadata 318. The processor 340 may execute computer executable instructions that are included in the client logic 312 and/or the application logic 314. Alternatively, or in addition the client logic 312, the application logic 314, and/or the data interface 316 may be referred to as a client logic unit 312, an application logic unit 314 and/or a data interface unit, respectively. The components of the client 130 may be in communication with each other over an interconnect 370, similar to the interconnect 270 in the memory appliance 110 or over any other type of interconnect.

The application logic 314 may include a user application, an operating system, a kernel, a device driver, a device firmware, a virtual machine, a hypervisor, a container, a jail, a cloud computing interface, a circuit, a logical operating system partition, or any other logic that uses the services provided by the client logic 312. The application logic 314 may be embedded in a chipset, an FPGA, an ASIC, a processor, or any other hardware device.

Figure 4:
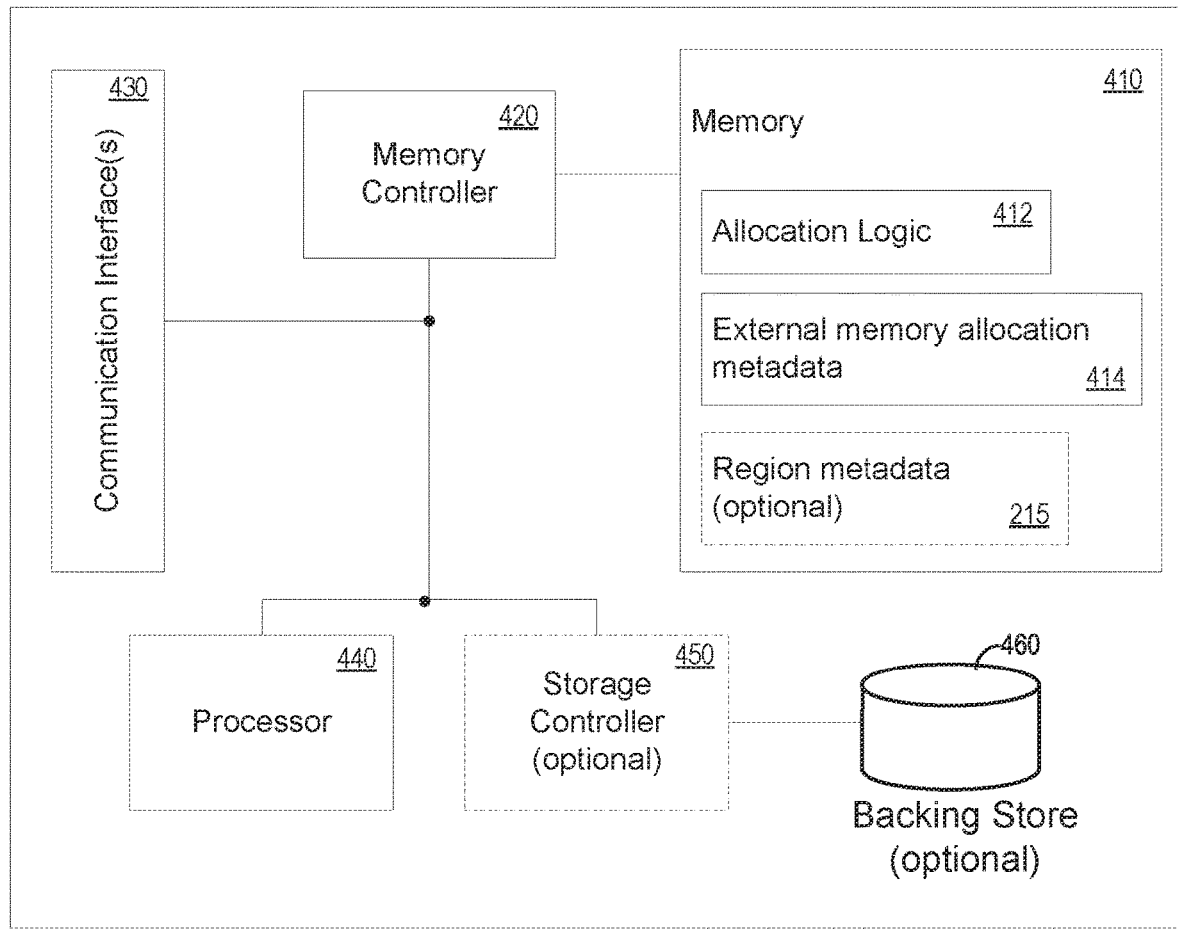
FIG. 4 illustrates an example management server.

FIG. 4 illustrates the example management server 120. The management server 120 may be a server, a device, an embedded system, a circuit, a chipset, an integrated circuit, a field programmable gate array (FPGA), an application-specific integrated circuit, a virtual machine, an operating system, a kernel, a device driver, a device firmware, a hypervisor service, a cloud computing interface, and/or any other hardware, software, and/or firmware entity which may perform the same functions as described. The management server 120 may include a memory 410, a processor 440, a communication interface 430, and a memory controller 420, similar to the memory 210, the processor 240, the communication interface 230, and the memory controller 220 of the memory appliance 110. The management server 120 may include more, fewer, or different components. For example, the management server may include a storage controller 450, a backing store 460, multiple storage controllers, multiple backing stores, multiple memories, multiple memory controllers, multiple processors, or any combination thereof. Alternatively, the management server 120 may just include a process executed by the processor 440.

The storage controller 450 and/or backing store 460 of the management server 120 may be internal to the management server 120, a physically discrete device external to the management server 120 that is coupled to the management server 120, included in a second management server or in a device different from the management server 120, included in the client 130, included in the memory appliance 110, part of a server, part of a backup device, part of a storage device on a Storage Area Network, and/or part of some other externally attached persistent storage. Alternatively, or in addition, the region 214 included in the memory appliance 110 may be used as the backing store 460 for the management server 120.

The memory 410 of the management server 120 may include an allocation logic 412 and/or external memory allocation metadata 414. The memory 410 of the management server 120 may include more, fewer, or different components. For example, the memory 410 of the management server 120 may include region metadata 215. The processor 440 may execute computer executable instructions that are included in the allocation logic 412. The allocation logic 412 may be referred to as an allocation logic unit. The components of the management server 120 may be in communication with each other over an interconnect 470, such as the interconnect 270 in the memory appliance 110 or over any other type of interconnect.

During operation of the external memory system, the region access logic 212 may provide the client 130 and/or management server 120 with client-side memory access to the region 214. Alternatively, or in addition, the region access logic 212 may provide other memory appliances with client-side memory access to the region 214. Client-side memory access may include a memory access operation. A memory access operation may include, for example, a read memory operation or a write memory operation. The memory access operation may be performed by the memory appliance 110 in response to receiving a request from the client 130 and/or management server 120 at the communication interface 230 of the memory appliance 110. The request may include, for example, a starting memory offset, a size of memory allocation, a starting memory location, a number of units of memory to access, or any other attribute relating to the requested memory access operation. The request may address the memory 210 on a block-addressable basis, a word-addressable basis, a byte-addressable basis, or on any other suitable unit of memory basis.

The region access logic 212 may register the region 214 with the communication interface 230 and/or with a device other than the memory appliance, such as with the client 130 and/or management server 120. Alternatively or in addition, the region access logic 212 may determine a location or locations in the memory 210 of the memory appliance 110 where the region 214 is located. The region access logic 212 may register the location or locations with the communication interface 230 and/or with a device other than the memory appliance 110, such as with the client 130 and/or management server 120.

The region access logic 212 may control and/or specify how the region 214 may be accessed. For example, the region access logic 212 may control which regions are available on the memory appliance 110 and/or which operations may be performed. In one example, the region access logic 212 may control access based upon the current time, day, month or year; an identity or a location of the communication interface, an identity or a location of the client and/or management server; or some other attribute of the client 130, the memory appliance 110, the management server 120, the interconnect 140, or of the surrounding environment that is detectable by the region access logic 212, such as the condition of the power source that powers the memory appliance 110. Alternatively or in addition, the region access logic 212 may control access based on an authentication mechanism, including but not limited to a password, a key, biometrics, or a cryptographic authentication.

The region access logic 212 or the communication interface 230 may provide client-side memory access using any memory access protocol now known or later discovered. The memory access protocol may be any communication protocol used to transfer data between a memory in a first device, such as the memory 310 in the client 130, and a memory in a second device, such as the memory 210 in the memory appliance 110, where the data is transferred independently of CPU's in the first and second devices, such as the processor 340 in the client 130 and the processor 240 in the memory appliance 110. Therefore, in examples where the first device includes an operating system, the data may be transferred from the memory of the first device to the memory of the second device without involvement of the operating system. Although instructions executed by the CPU may direct a hardware data controller to transfer the data from the memory of the first device to the memory of the second device, the actual transfer of the data between the memories may be completed without involvement of the CPU and, if the first device includes an operating system, without involvement of the operating system. The memory access protocol may describe, for example, a format of the request for the memory access operation to be performed on the memory in the second device or system.

The memory access protocol may be implemented, for example, using one or more hardware controllers, such as the communication interface 230 in the memory appliance 110 and the communication interface 330 in the client 130. The memory access protocol and electrical characteristics of the hardware controller may be part of a common standard. Accordingly, the memory access protocol and electrical characteristics of the communication interfaces may be part of one standard. In one example, the access protocol may be the RDMA protocol implemented in the communication interfaces, where the memory access protocol and the communication interfaces conform to an InfiniBand standard. In a second example, the memory access protocol may be Internet Wide Area RDMA Protocol (iWARP), where iWARP is implemented in the communication interfaces, and where the communication interfaces conform to an iWARP standard. The iWARP standard, which is an Internet Engineering Task Force (IETF) protocol, is RDMA over TCP (Transport Control Protocol). In a third example, the memory access protocol may be RDMA over Converged Ethernet (RoCE), where RoCE is implemented in the communication interfaces, and where the communication interfaces conform to RoCE and Ethernet standards. In a fourth example, the memory access protocol may be a PCI bus-mastering protocol implemented in the communication interfaces, where the communication interfaces conform to a PCI standard. The memory access protocol, such as RDMA, may be layered directly over a transport protocol, such as TCP.

The region access logic 212, the client logic 312, and/or the allocation logic 412 may utilize multiple communication interfaces to provide resiliency against various communication failure modes. Communication failure modes may include failure of one or more communication interfaces, failure of one or more ports included in one or more communication interfaces, failure of a portion of the interconnect, such as an interconnect cable or interconnection fabric switch, and/or any other failure that may sever a network link between any two communication interfaces. The region access logic 212 may provide resiliency against communication failure modes using features of the communication interfaces. In a first example, the region access logic 212 may configure the communication interfaces to use an alternate path if a primary path experiences interconnect errors, such as using InfiniBand Automatic Path Migration. In a second example, the region access logic 212 may provide resiliency against communication failure modes by choosing communication modes that are by design resilient against interconnect errors, such as InfiniBand reliable connections, TCP connections, etc. Alternatively, or in addition, the region access logic 212 may provide resiliency against communication failure modes by establishing multiple active network links, and using one or more of the non-failing network links to provide connectivity. The multiple active network links may be selected to optimize redundancy versus failures. For example, the multiple network links may utilize different ports on different communication interfaces, such that a failure of one port or one communication interface may only cause one of the multiple active network links to fail.

In one or more examples, the region access logic 212 may additionally provide block-level access to the region 214 using any storage protocol now known or later discovered.

A storage protocol may be any communications protocol used to transfer data between a block storage device or system, such as the memory appliance 110, and a device or system, such as the client 130, that stores data in, and/or retrieves data from, the block storage device or system. A storage protocol may be implemented, for example, using one or more software and/or hardware storage controllers. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the interconnect, that conforms to the USB standard. In a second example, the storage protocol may be the SCSI command protocol. In a third example, the storage protocol may be the SATA protocol. Additional examples of the storage protocol include Serial Attached SCSI (SAS) and Internet Small Computer System Interface (iSCSI). Alternatively or in addition, the region access logic 212 may provide block-level access using any storage protocol that transfers data with a data transfer protocol, such as SCSI over Fibre Channel, SCSI RDMA Protocol (SRP) over Remote Direct Memory Access (RDMA), iSCSI over TCP/IP, or any other combination of storage protocol and data transfer protocol known now or discovered in the future.

Accessing the region 214 using the storage protocol may be slower than accessing the region 214 using the memory access protocol. In contrast to the memory access protocol, the processor 340 of the client 130 may interact with the storage controller 350 during the transfer of data to the block storage device 360 or system, where the storage controller implements the storage protocol. Therefore, the storage protocol is different from the memory access protocol.

By providing block-addressable client-side memory access and/or block-level access through the region access logic 212, the memory appliance 110 may be considered, in an example implementation, a block storage device. A block storage device may also be referred to as a block device. A block device stores data in blocks of a predetermined size, such as 512 or 1024 bytes. The predetermined size may be configurable. A block device is accessed via a software and/or hardware storage controller and/or a communication interface, such as the communication interface 230. Examples of other block devices include a disk drive having a spinning disk, a tape drive, a floppy disk drive, and a USB flash pen drive.

The region access logic 212 may subdivide the memory 210, and/or the backing store 260 into one or more regions. Each one of the regions, such as the region 214 in the memory 210 of the memory appliance 110, may be a configured area of storage that is accessible via any access protocol and/or storage protocol. Access protocols and storage protocols are described elsewhere in this disclosure.

The backing store 260 may include any block device. Examples of block devices include, but are not limited to, hard disks, CD-ROM drives, tape drives, solid state storage devices, flash drives, or any other mass storage device.

The client logic 312 and/or the allocation logic 412 may perform memory access operations on the region 214 in the memory 210 of the memory appliance 110 using client-side memory access over the memory access protocol.

Alternatively or in addition, the client logic 312 and/or the allocation logic 412 may perform operations to discover the memory appliance 110 when connected, or to discover available regions that may be accessible on the memory appliance 110. Alternatively or in addition, the client logic 312 and/or the allocation logic 412 may perform administration operations to modify attributes or metadata, such as the region metadata 215, associated with the region 214. The operations may include sending region access logic requests, described elsewhere in this disclosure. In an example, the client logic 312 and/or the allocation logic 412 may perform an administration operation to set a human readable label associated with the region 214. In an example, the client logic 312 and/or the allocation logic 412 may perform an administration operation to change the operations that are available to the client 130 and/or to other clients. The administration operations may be used, for example, to coordinate shared access to the region by multiple clients.

The client logic 312, the allocation logic 412, and/or another logic may perform operations that communicate information to the observer logic 218 about a set of one or more memory access operations that were requested or that are to be requested by the client logic 312, the allocation logic 412, and/or another logic. For example, the client logic 312, the allocation logic 412, and/or another logic may transmit a notification message via the communication interface 330 of the client 130 and/or the communication interface 430 of the management server 120. The observer logic 218 may receive the notification message via the communication interface 230 of the memory appliance 110. The notification message may precede or follow the set of memory access operations requested by the client logic 312 and/or the allocation logic 412. The notification message may identify attributes of the set of memory access operations.

Alternatively or in addition, the client logic 312, the allocation logic 412, and/or another logic may perform memory access operations that are directly observable or identified by the observer logic 218. For example, the request to perform the memory access operation may include notification information, such as an RDMA write with immediate value operation. In addition to writing to the memory in the region 214, the write with immediate value operation may cause the observer logic 218 to receive a notification that includes the immediate value specified by the client logic 312 and/or the allocation logic 412 in the RDMA write with immediate value operation. The value may include one or more attributes of the memory access operation. For example, the value may indicate what portion of the memory 210 is written to during the RDMA write with immediate value operation. Alternatively or in addition, the client logic 312 and/or the allocation logic 412 may perform operations that create a condition at the memory appliance 110 that the observer logic 218 may check for. For example, the client logic 312 and/or the allocation logic 412 may perform a client-side memory access operation to store information about a set of memory access operations in a particular portion of the memory on the memory appliance 110. The information stored in the portion may include, for example, the offset, size, and/or type of each memory access operation performed. The observer logic may check the portion for updates in order to identify one or more attributes of the memory access operations.

The observer logic 218 may observe or otherwise identify the operations requested by the client logic 312, the allocation logic 412, and/or another logic that are performed on the region 214 and/or the memory appliance 110. The observer logic 218 may identify the requested operations based on direct communication between the memory appliance 110 and any of: the client 130, the management server 120, and/or another memory appliance. For example, the observer logic 218 may listen for incoming notification messages at the communication interface 230. Alternatively, or in addition, the observer logic 218 may passively monitor the operations requested by the client logic 312, the allocation logic 412, and/or another logic. For example, the observer logic 218 may listen for notification messages received as a result of operations performed by the client logic 312, the allocation logic 412, and/or another logic.

Alternatively, or in addition, the observer logic may check for conditions created by the client logic 312, the allocation logic 412, another logic, the communication interfaces, and/or another hardware component. For example, the observer logic 218 may read contents of one or more portions of the memory 210 that are accessible by the client 130 and/or the management server 120 using client-side memory access, by the communication interfaces, or by another hardware component. In an example, a first portion of the memory 210 may include one or more flags that indicate whether one or more second portions of the memory 210 have been updated by the memory access operations since the one or more second portions of the memory 210 were last copied to the backing store 260. In a second example, a first portion of the memory 210 may include one or more flags that indicate whether one or more second portions of the memory 210 have been read or written by the memory access operations since the last time the flags have been checked by the observer logic 218. In a third example, a first portion of the memory 210 may include one or more values that indicate how many times one or more second portions of the memory 210 have been read or written by the memory access operations since the last time the values have been checked by the observer logic 218.

In response to identifying a set of memory access operations, the observer logic 218 may take further action. In an example, further action may include determining statistics related to the memory access operations (including but not limited to the type of operation, the number of operations, the size of the affected memory, and/or memory locations of each operation). In a second example, further action may include tracking or identifying regions of the memory 210 that have been written to or otherwise affected by the memory access operations. The observer logic 218 may persist the contents of the affected regions of the memory 210 to the backing store 260, backing stores, and/or duplicate the contents of the affected regions of the memory 210 to another memory appliance, a block device, an external server, and/or a backup device. Alternatively, the observer logic 218 may take any other action related to the memory access operations.

The memory access operation may complete at the memory appliance 110 without waiting for the observer logic 218 to identify the memory access operation. Alternatively or in addition, the memory access operation may complete at the memory appliance 110 without waiting for the observer logic 218 to take any further action in response to identifying the memory access operation. Accordingly, the client logic 312 and/or the allocation logic 412 may perform a write operation to the region 214 in the amount of time that the request to perform the write operation travels over the interconnect 140 and the memory appliance 110 writes data to the memory. The overhead associated with storage protocols and/or writing the data to the backing store 260 may be avoided.

Mechanisms for observing or identifying the operations requested by the client logic 312 and/or the allocation logic 412 and the actions taken in response to identifying the operations may take any of numerous forms. A particular mechanism may balance tradeoffs between individual operation latency, operations per second from an individual client and/or management server, aggregate operations per second from multiple clients and/or management servers, demand placed upon compute resources of the clients, demand placed on compute resources of the management servers, and demand placed on compute resources of the memory appliance or on the observer logic, among others.

Alternatively or in addition the observer logic 218 may not observe or identify the memory access operations performed. Alternatively or in addition, the observer logic 218 may take one or more actions without specific knowledge of the memory access operations. For example, the observer logic 218 may persist the entire contents of the region 214 to the backing store 260; duplicate the entire contents of the region 214 to another storage device, external server, and/or backup device; and/or take some other action related to the region 214. Alternatively or in addition, the observer logic 218 may compare the contents of the region 214 with the contents of the backing store 260. Alternatively or in addition, the observer logic 218 may use computed hash values to determine which areas of the region 214 have been modified. A computed hash value may be a computed output which is expected with high probability to have a different value for two different input buffers and which may be smaller than one or both input buffers. Examples of computed hash values include checksums, cyclic redundancy check codes, and cryptographic hash codes. The observer logic 218 may perform actions without knowledge of the memory access operations periodically, prior to system shutdown, according to a schedule, or in response to a particular event, such as a hardware interrupt.

Alternatively, a client-side memory access may be performed as described in this disclosure, and then the client logic 312 may choose to wait for an additional notification from the observer logic 218 that the further actions are complete. For example, the client-side memory access may be a first client-side memory access, and the further actions may include replicating data from the affected regions to one or more additional memory appliances using additional client-side memory accesses between the memory appliances. Waiting for the additional notification for the first client-side memory access provides assurance to the client logic 312 that the affected regions have been synchronized between the multiple memory appliances. If an application is performing activities that may benefit from this assurance, it may be beneficial to wait for the additional notification. While waiting for the additional notification does increase the overall latency of the first client-side memory access by the time it takes for the observer logic 218 to be notified and replicate the affected regions and the time it takes to receive the additional notification, the client logic 312 still does not need to wait for the observer logic 218 of the additional memory appliances to be notified or take any action.

The application logic 314, the client logic 312, the allocation logic 412, and/or another logic may perform data translation on the data being read and/or written to the region 214. Alternatively, or in addition, the communication interfaces 230 330 430, the memory controllers 220 320 420, the storage controllers 250 350 450, and/or the backing stores 260 360 460 may perform data translation. Data translation may include manipulating the data being read and/or written.

In a first example, data translation may include compressing the data being written to the region 214 and/or decompressing the data being read from the region 214. Compression and/or decompression may be performed using any one or more compression schemes, such as Lempel-Ziv (LZ), DEFLATE, Lempel-Ziv-Welch (LZW), Lempel-Ziv-Renau (LZR), Lempel-Ziv-Oberhumer (LZO), Huffman encoding, LZX, LZ77, Prediction by Partial Matching (PPM), Burrows-Wheeler transform (BWT), Sequitur, Re-Pair, arithmetic code, and/or other scheme which may be used to recoverably reduce the size of data.

In a second example, data translation may include encrypting the data being written to the region 214 and/or decrypting the data being read from the region 214. Encryption and/or decryption may be performed using any one or more encryption schemes and/or ciphers, such as symmetric encryption, public-key encryption, block ciphers, stream ciphers, substitution ciphers, transposition ciphers, and/or any other scheme which may be used to encode information such that only authorized parties may decode it. One or more encryption keys for the one or more encryption schemes may be included in the access parameters for the region 214.

In a third example, data translation may include performing error detection and/or error correction upon the data being written to the region 214 and/or the data being read from the region 214. Error detection and/or error correction may be performed using any one or more error detection and/or error correction schemes, such as repetition codes, parity bits, checksums, cyclic redundancy checks, cryptographic hash functions, error correcting codes, forward error correction, convolutional codes, block codes, Hamming codes, Reed-Solomon codes, Erasure Coding-X (EC-X) codes, Turbo codes, low-density parity-check codes (LDPC), and/or any other scheme which may be used to detect and/or correct data errors.

Error detection and/or error correction may include performing additional calculations to confirm the integrity of the data written to and/or read from the region. For example, one or more digests, described elsewhere in this document, may be written to the region 214 and/or to the region metadata 215 for one or more corresponding portions of the region 214. When reading the corresponding portion, if the stored digest does not match the digest which can be computed from the read data for the portion, then the read may be considered failed and/or the portion may be considered corrupted. Alternatively or in addition, the data may be corrected based upon the one or more digests and/or error correcting codes.

Further examples may include performing multiple types of data translation. For example, the client logic or another entity may encrypt the data being written to the region 214 and compute one or more error detecting and/or error correcting codes for the data and/or for the encrypted data. Alternatively or in addition, the client logic or another entity may decrypt the data being read from the region 214 and may perform error detection and/or error correction upon the data and/or encrypted data being read from the region.

The application logic 314, the client logic 312, the allocation logic 412, and/or another logic may perform data monitoring on the data being read and/or written to the region 214. Alternatively, or in addition, the communication interfaces, the memory controllers, the storage controllers, and/or the backing stores may perform data monitoring. Data monitoring may include observing the data being read and/or written. In an example, data monitoring may include performing virus scanning on data being read from and/or written to the region 214. In a second example, data monitoring may include performing malware detection on data being read from and/or written to the region 214. In a third example, data monitoring may include performing policy enforcement, such as monitoring for forbidden data patterns and/or strings, on data being read from and/or written to the region 214. In a fourth example, data monitoring may include performing data indexing on data being read from and/or written to the region 214. For example, an index for a first region may be created in a second region, the index providing fast lookup of data in the first region.

The region access logic 212, the client logic 312, and/or the allocation logic 412 may utilize multiple regions 214 to provide resiliency against memory appliance 110 failures. For example, the external memory allocation may include metadata describing a logical relationship between the regions 214 referenced by the external memory allocation. In one example, the logical relationship may be a concatenation of regions 214 located in different memory appliances 110, the metadata describing the logical relationship may include an indication that concatenation is in use and/or a logical address within the external memory allocation at which the region's data logically exists. Alternatively, or in addition, the logical relationship may be a striping relationship, such as RAID-0; a mirroring relationship, such as RAID-1; a parity relationship, such as RAID-2, RAID-3, RAID-4, RAID-5, or RAID-6; an erasure-coding logical relationship; a regenerative-coding logical relationship; Maximum Distance Separable (MDS) codes; Minimum Storage Regenerating (MSR) codes; Minimum Bandwidth Regenerating (MBR) codes; Reed-Solomon codes; Erasure Coding-X (EC-X); a partial data redundancy relationship; a combination of relationships, such as striping with mirroring; or any other relationship between regions known now or later discovered. Different logical relationships may provide different levels of resiliency and/or performance to suit an application's needs. For example, a striping logical relationship may provide improved performance with reduced resiliency, while a RAID-5 logical relationship may provide improved resilience with reduced performance. In other examples, a mirroring logical relationship may provide improved resilience with improved performance in some scenarios, such as when using the techniques described in this disclosure. Memory appliance failures may be any failures which prevent a memory appliance 110 from performing its function(s), such as allowing access by clients 130 and/or communications with clients 130, other memory appliances 110, and/or management servers 120. Memory appliance failures may include the communication failure modes.

The memory of the memory appliance 110 may include a resiliency logic 216. Alternatively or in addition, the resiliency logic 216 may be wholly or partially included in one or more other logics, such as the region access logic 212, the observer logic 218, the client logic 312, and/or the allocation logic 412. The resiliency logic 216 may perform activities in support of providing resiliency against memory appliance failures, communication failure modes, and/or any other types of failure modes. For example, the resiliency logic 216 may enable the client logic 312 to maintain multiple connections to the region 214 by providing information regarding path diversity between the client 130 and the memory appliance 110. In another example, the resiliency logic 216 may coordinate with one or more other resiliency logics 216 to maintain the logical relationship between the region 214 and regions 214 corresponding to the one or more other resiliency logics 216.

The resiliency logic 216 may coordinate with one or more other resiliency logics 216 in forming a logical cluster of resiliency logics. The logical cluster of resiliency logics may be considered a resiliency logic cluster. The resiliency logic cluster may be one or more resiliency logics 216 which correspond to one or more regions 214 of a resiliency set. The resiliency set may be one or more regions 214 that are in a logical relationship with each other. For example, the resiliency set may be one or more regions 214 in a RAID-5 logical relationship and/or the resiliency logic cluster may be one or more resiliency logics 216 for regions 214 in the RAID-5 logical relationship.

The resiliency logic cluster may be formed based upon a cluster configuration with the allocation logic 412, the region access logic 212, and/or the resiliency logic 216. The cluster configuration may be specified manually, such as via a user interface and/or may be specified automatically, such as by the allocation logic 412 using provisioning rules. An example of a provisioning rule leading to automatic formation of a resiliency logic cluster is a provisioning rule specifying a three-way-mirroring logical relationship be used for any new external memory allocations allocated to a specified user and/or group. When it is said that the resiliency logics and/or the resiliency logic cluster performs an operation, the operation may be performed by one or more of the constituent resiliency logics 216 of the resiliency logic cluster in a coordinated way. Each constituent resiliency logic 216 may perform discrete sub-operations that when taken as a whole have the effect as if the resiliency logic cluster as a whole performs the operation so described.

The resiliency logic cluster may elect a resiliency logic 216 to be the resiliency logic cluster leader. The resiliency logic cluster leader may be the resiliency logic 216 elected to perform certain activities in examples where having a single, consistent resiliency logic 216 do so would be advantageous. The resiliency logic cluster leader may be elected using any leader election logic and/or coordinator election logic now known or later discovered. Examples of leader election logics and/or coordinator election logics are Shout, Mega-Merge, YO-YO, Bully, Chang and Roberts, Hirschberg-Sinclair, Korach-Kutten-Moran, Paxos, Virtual Synchrony, and/or Raft. The leader election logic and/or coordinator election logic may use any one or more characteristics and/or configurations of the memory appliance 110 to differentiate the corresponding resiliency logics 216, such as serial numbers of the memory appliance 110 and/or any component parts (such as the communication interface(s) 230), configured priority value(s), uptime, resource availability, etc. In examples where one or more preferred differentiating characteristics and/or configurations fail to differentiate between two or more resiliency logics 216, the leader election logic and/or coordinator election logic may use other characteristics and/or configurations as secondary, tertiary, etc. differentiators until each resiliency logic 216 is differentiated from all others.

Characteristics or configurations of the management server 120, the memory appliance 110, and/or the client 130 may include hardware revisions, firmware revisions, software revisions, protocol revisions, physical location, logical location, network location, network topology, network bandwidth, network capacity, network utilization, logical grouping, labels, names, server/appliance health, server/appliance utilization, server/appliance overall performance rating, processor type, number of processors, processor speed, memory bandwidth, memory capacity, memory utilization, memory health, backing store presence, backing store bandwidth, backing store input/output operations per second (IOPS), backing store latency, backing store capacity, backing store utilization, backing store health, battery presence, battery type, battery chemistry, battery capacity, battery utilization, battery % charged, battery time remaining, battery health, or any other characteristic or combination of characteristics of the management server 120, the memory appliance 110, and/or the client 130.

In some examples, the client logic 312 may get information related to the external memory allocation, the resiliency set, and/or the resiliency logic cluster by sending to the allocation logic 412 a request to get information regarding the external memory allocation, as described in U.S. non-provisional patent application Ser. No. 14/530,908, filed Nov. 3, 2014, entitled "DYNAMICALLY PROVISIONABLE AND ALLOCATABLE EXTERNAL MEMORY," the entire contents of which is hereby incorporated by reference, and U.S. non-provisional patent application Ser. No. 14/554,655, filed Nov. 26, 2014, entitled "PROVISIONING OF EXTERNAL MEMORY", the entire contents of which is hereby incorporated by reference. Alternatively or in addition, the client logic 312 may retrieve the information from the region access logic 212 and/or the resiliency logic 216 associated with one or more of the regions 214 of the external memory allocation and/or the resiliency set. The information retrieved may enable the client logic 312 to communicate with the corresponding region access logics 212, resiliency logics 216, and/or observer logics 218 for the external memory allocation and/or the resiliency set. Alternatively or in addition, the information retrieved may enable the client logic 312 to communicate with a subset of the corresponding region access logics 212, resiliency logics 216, and/or observer logics 218 for the external memory allocation and/or the resiliency set. Alternatively or in addition, the client logic 312 may get information related to the external memory allocation, the resiliency set, and/or the resiliency logic cluster in another way, such as by querying one or more region access logics 212, resiliency logics 216, and/or observer logics 218. In another example, the client logic 312 may get information related to the external memory allocation, the resiliency set, and/or the resiliency logic cluster by sending to the region access logic 212 a request to get information for the regions. The information retrieved may enable the client logic 312 to communicate with one or more of the corresponding region access logics 212, resiliency logics 216, and/or observer logics 218 for the external memory allocation and/or the resiliency set. Upon communicating with one or more region access logics 212, resiliency logics 216, and/or observer logics 218 for the external memory allocation and/or the resiliency set, the client logic 312 may receive additional information related to the external memory allocation, the resiliency set, and/or the resiliency logic cluster from the region access logics 212, resiliency logics 216, and/or observer logics 218. For example, the resiliency logic 216 may send a resiliency set notification to the client logic 312 upon establishing communication between the client logic 312 and the resiliency logic 216.

Figure 5:
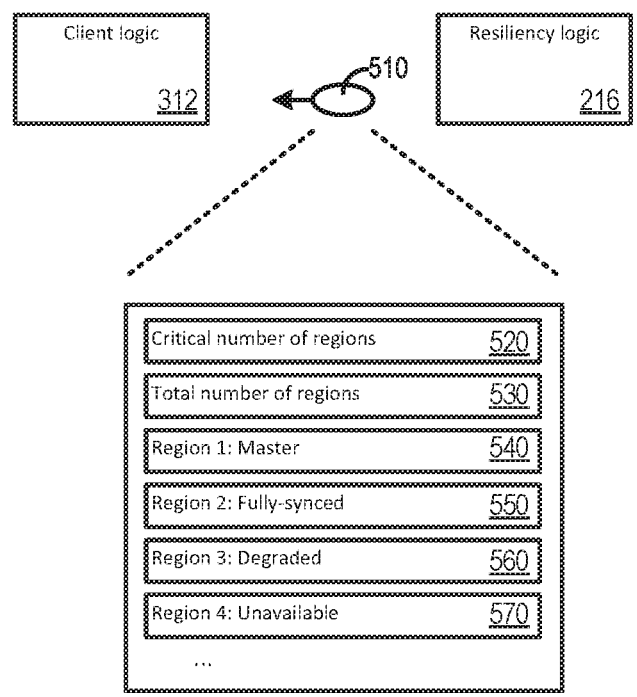
FIG. 5 illustrates an example resiliency set notification.

FIG. 5 illustrates an example resiliency set notification. The resiliency logic 216 may send the resiliency set notification 510 to the client logic 312 upon establishing communication between the client logic 312 and the resiliency logic 216 and/or at other times. For example, the resiliency logic 216 may send the resiliency set notification 510 to the client logic 312 when the information conveyed by the resiliency set notification 510 changes. Alternatively, or in addition, the resiliency logic 216 may send the resiliency set notification 510 to the client logic 312 periodically, upon a request by the client logic 312, and/or in response to some other event. In some examples, the resiliency logic 216 may send the resiliency set notification 510 to the client logic 312 even when the information conveyed has not changed.

The resiliency set notification 510 may convey information related to the resiliency set, its regions 214, and/or the corresponding memory appliances 110. The conveyed information may be any information which supports maintaining the resiliency logic cluster and/or providing resiliency against memory appliance failures. In one example, the resiliency set notification 510 may identify a critical number of regions 520 needed to maintain resiliency. The critical number of regions 520 may be specified manually, such as via a user interface and/or may be specified automatically, such as by the allocation logic 412 using provisioning rules. In another example, the critical number of regions 520 may be specified automatically by one or more of the resiliency logics 216 of the resiliency logic cluster, such as based on the number of regions 214 in the resiliency set. For example, the critical number of regions 520 may be specified automatically to be at least 50% of the number of regions 214 in the resiliency set. In another example, the critical number of regions 520 may be specified automatically based on the logical relationship between the regions 214. For example, for a resiliency set in a RAID-5 logical relationship, the critical number of regions 520 may be three. Alternatively or in addition, the resiliency set notification 510 may identify the number of regions 530 in the resiliency set.

Alternatively or in addition, the resiliency set notification 510 may include one or more identifiers for the regions in the resiliency set, for the corresponding resiliency logics, for the corresponding region access logics, for the corresponding observer logics, and/or for the corresponding memory appliances. For each identifier or group of identifiers, the resiliency set notification 510 may include status information for the corresponding region(s), resilience logic(s), region access logic(s), observer logic(s), and/or memory appliance(s). For example, a first region 540 may be identified as being a master region. The master region may be the region corresponding to the resiliency logic that was selected to be the resiliency logic cluster leader. The master region may have additional status information, such as described for the other regions 214 in this example resiliency set notification 510. In another example, a second region 550 may be identified as being fully-synchronized. The second region 550 being considered fully-synchronized may mean that all of the data included in the second region 550 are considered correct, considering the sequence of client-side memory access operations that have been performed against the resiliency set. Zero or more regions 214 may be identified as fully-synchronized. In another example, a third region 560 may be identified as being degraded. The third region 560 being considered degraded may mean that not all of the data included in the third region 560 are considered correct, considering the sequence of client-side memory access operations that have been performed against the resiliency set. For example, one or more client-side memory access write operations may have failed against the third region 560 and/or the data of the third region 560 may not have been compared and/or synchronized with other regions 214 of the resiliency set. Zero or more regions 214 may be identified as degraded. In another example, a fourth region 570 may be identified as being unavailable. The fourth region 570 being considered unavailable may mean that one or more logics may be unable to establish communications with the region 570, its region access logic 212, its resiliency logic 216, and/or its observer logic 218. For example, if a portion of the interconnect 140 servicing the corresponding memory appliance 110 and/or its communication interfaces 230 has failed, it may not be possible to communicate with any of its logics 212, 216, 218, so the fourth region 570 may be considered unavailable. A region 214 that is unavailable might also be degraded or fully synchronized, depending upon the sequence of client-side memory access operations that have been performed against the resiliency set. For regions 214 identified as degraded and/or unavailable, the resiliency set notification 510 may include information identifying which portions of the region(s) 214 are up-to-date. Alternatively or in addition, for regions 214 identified as degraded and/or unavailable, the resiliency set notification 510 may include information identifying which portions of the region(s) 214 are not up-to-date.

The client logic 312 may read the data of the resiliency set by performing a client-side memory access operation against one or more of the regions 214 of the resiliency set. In one example, the client logic 312 may perform the client-side memory access operation against the master region (such as the first region 540). In other examples, the client logic 312 may perform the client-side memory access operation against one or more fully-synchronized regions (such as the second region 550). In some examples, such as when the client logic is aware of which portions are up-to-date, the client logic may perform the client-side memory access operation against one or more degraded and/or unavailable regions (such as the third region 560 or the fourth region 570).

In examples where the resiliency set uses a logical relationship which distributes the data across multiple regions 214, the client logic 312 may perform the client-side memory access operation across one or more regions 214 and/or may perform additional calculations upon the retrieved information to reconstruct the stored data of the resiliency set. For example, with a parity-based logical relationship, the client logic 312 may retrieve data from three regions which may hold the actual data of the resiliency set and/or from another region which may hold parity data of the resiliency set. The client logic may perform a parity computation to reconstruct part or all of the data of the resiliency set. In another example, the client logic 312 may perform data translation to reconstruct part or all of the data of the resiliency set. The data translation may be performed on the data of the resiliency set (such as data written by the application logic) and/or the data translation may be performed on the data of one or more regions. When data translation is performed on the data of one or more regions, the data translation may be performed independently, such as with different encryption keys for each region, or may be performed with some operations and/or parameters in common between regions, such as with a shared encryption key for all regions of the resiliency set. In other examples, such as with an erasure-coding-based logical relationship, the client logic 312 may retrieve data from a subset of the regions of the resiliency set and/or may perform data translation (such as erasure decoding) to reconstruct some or all of the stored data of the resiliency set.

The client logic 312, the resiliency logic 216, another logic, and/or another entity, such as one or more of the communication interfaces 230 330 430, may perform additional calculations to confirm the integrity of the data written to and/or read from the resiliency set and/or the regions, such as error detection and/or error correction. For example, one or more digests, described elsewhere in this document, may be written to the regions 214 and/or to the region metadata 215 for one or more corresponding portions of the regions 214. When reading the corresponding portion, if the stored digest does not match the digest which can be computed from the read data for the portion, then the read may be considered failed and/or the portion may be considered corrupted. Alternatively or in addition, the data may be corrected based upon the one or more digests and/or error correcting codes. In examples where the read is considered failed, the portion is considered corrupted, and/or the data cannot be corrected, the client logic may read the data from one or more other regions of the resiliency set.

The client logic 312 may reply to the resiliency set notification 510, such as by acknowledging receipt. In some examples, if the client logic 312 has one or more client-side memory access operations pending against the regions 214 of the resiliency set, the client logic 312 may delay replying to the resiliency set notification 510. For example, if the client logic 312 is reading from a region which is newly-indicated to be degraded, the client logic 312 may wait for the read operation to complete, may cancel the read operation, and/or may re-issue the read operation against a different region of the resiliency set prior to replying to the resiliency set notification 510. Alternatively, the client logic 312 may not wait for the pending client-side memory access operations to complete and/or may allow the operations to proceed and/or complete successfully. For example, the client logic 312 may consider operations that started before the resiliency set notification 510 was received to be consistent and/or correct, if for example the application logic 314 assumes that any operations requested concurrently may complete in arbitrary order and/or that any read operations may return the data of the resiliency set from before, during, or after any concurrent write operations.

Figure 6:
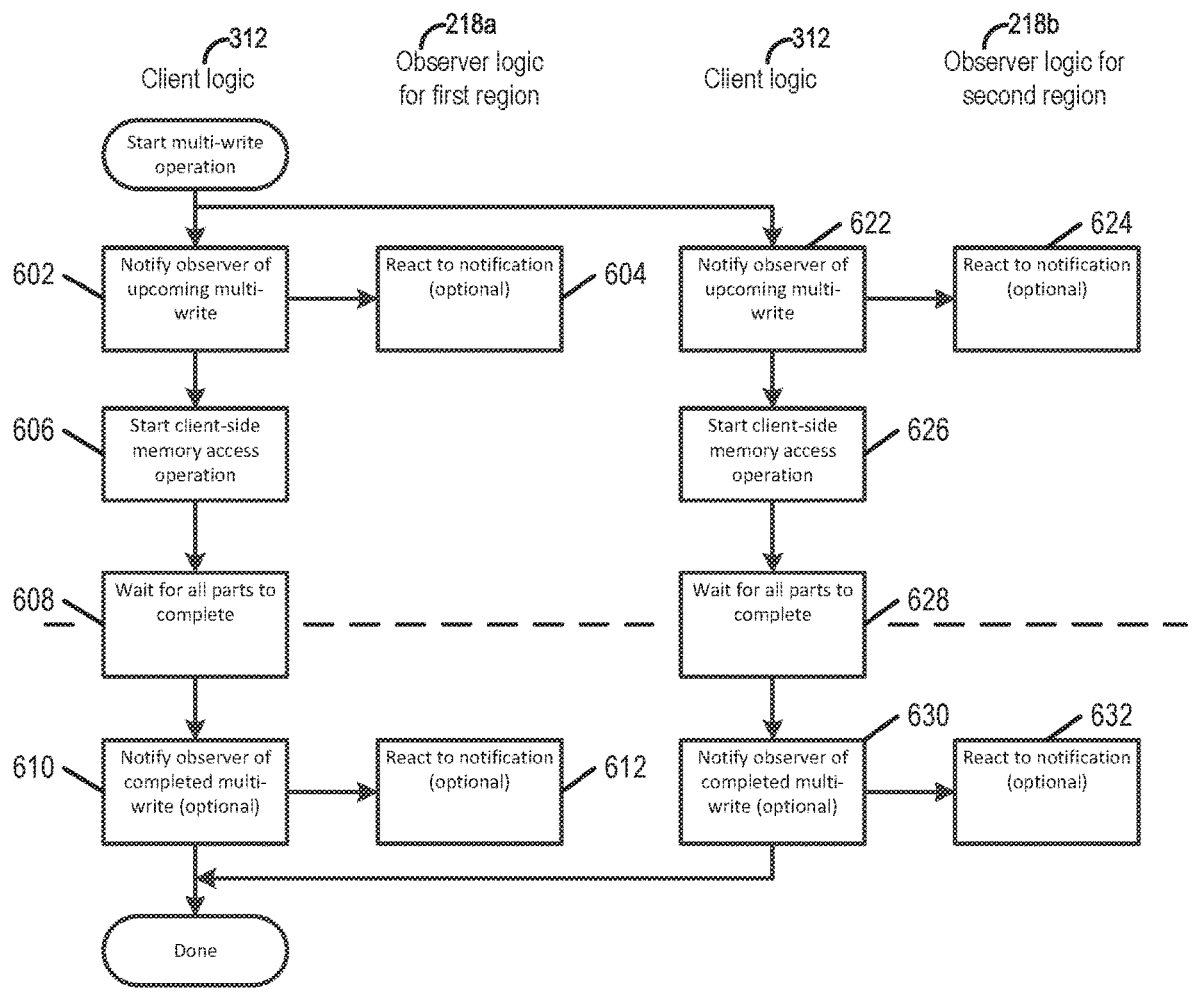
FIG. 6 illustrates an example multi-write operation.

FIG. 6 illustrates an example multi-write operation. The client logic 312 may write data to the resiliency set by performing the multi-write operation against one or more of the regions 214 of the resiliency set. The multi-write operation may begin by the client logic 312 notifying (602) an observer logic for a first region (a first observer logic) 218a of the multi-write operation. Notifying (602) the first observer logic 218a of the multi-write operation may include sending a multi-write notification message to the first observer logic 218a.

Alternatively or in addition, notifying (602) the first observer logic 218a of the multi-write operation may include performing a client-side memory access operation to write some data to the memory 210 of a first memory appliance (which corresponds to the first observer logic 218a), such that the first observer logic 218a may observe the written data as needed. For example, the client logic 312 may perform a client-side memory access write operation to write data to a pending multi-writes region within the memory 210 of the first memory appliance. The pending multi-writes region may include one or more entries, such as an array of entries, where each entry represents a possible multi-write operation that may be underway. By writing to an entry in the pending multi-writes region, the client logic 312 may make it possible for the first observer logic 218a to observe that the multi-write operation had been underway. For example, if the first observer logic 218a and the client logic 312 were to experience one or more communication failure modes, the first observer logic 218a may process the data written by the client logic 312 to identify multi-write operations which may have been underway. For each identified multi-write operation, the first observer logic 218a may conclude that the multi-write operation failed to write to the first region and/or may track the failed operation, such as described for FIG. 7 and/or elsewhere in this document.

The multi-write notification message and/or the data written to the memory 210 of the first memory appliance may indicate to the first observer logic 218a or provide the first observer logic 218a with, for example: a unique identifier such as a transaction identifier associated with the multi-write operation, the type of operation(s) to be performed, the region(s) 214 on which the operations are to be performed, the location within the region(s) 214 where the operations will be performed, the size of the data on which the operation(s) will be performed, and/or any other attributes of the operation(s) to be performed.

In response to being notified, the first observer logic 218a may optionally react (604) by taking one or more actions. An action may include, for example, aggregating statistics regarding the operation(s) to be performed, tracking portions of the region 214 that are to be written to or read from, and/or some other action related to the operation(s). Alternatively or in addition, the first observer logic 218a may delay reacting until and/or unless some other event were to occur. For example, if the first observer logic 218a later recognized a failure in communications with the client logic 312, the first observer logic 218a may, for each operation that it was previously notified (602) about and/or for each operation identified in the pending multi-writes region, treat that operation as having failed to complete against all regions 214 of the resiliency set.

After notifying the first observer logic 218a of the multi-write operation, the client logic 312 may proceed by starting (606) a client-side memory access operation against a first region, which corresponds to the first observer logic 218a. For example, the client logic 312 may start an RDMA write against the first region to write the data of the multi-write operation to the first region. In another example, the client logic 312 may start an RDMA write against the first region to write some other data related to the multi-write operation to the first region, such as parity data, error-detecting-code data, and/or error-correcting-code data. In other examples, the data written may be the result of data translation, as described in U.S. non-provisional patent application Ser. No. 14/530,908, filed Nov. 3, 2014, entitled "DYNAMICALLY PROVISIONABLE AND ALLOCATABLE EXTERNAL MEMORY," the entire contents of which is hereby incorporated by reference, and U.S. non-provisional patent application Ser. No. 14/554,655, filed Nov. 26, 2014, entitled "PROVISIONING OF EXTERNAL MEMORY", the entire contents of which is hereby incorporated by reference.

In some examples, the client-side memory access operation may be an observable client-side memory access operation, such as described in U.S. patent application Ser. No. 13/036,544, filed Feb. 28, 2011, entitled "High performance data storage using observable client-side memory access" by Stabrawa, et al., which published as US Patent Application Publication US2012/0221803 A1, and which is hereby incorporated by reference.

Such as when performing the multi-write operation against more than one region, the client logic may perform some steps concurrently, such as shown in FIG. 6. For example, the client logic may notify (622) a second observer logic 218b of the multi-write operation and/or start (626) a client-side memory access operation against a second region, which corresponds to the second observer logic 218b. The second region may be in the same resiliency set as the first region. Notifying (622) the second observer logic 218b of the multi-write operation may include the same or similar actions and/or logic as described for notifying (602) the first observer logic 218a. In response to being notified, the second observer logic 218b may optionally react (624) by taking one or more actions. The actions taken by the second observer logic 218b may include the same or similar actions as described for the actions of the first observer logic 218a.

In other examples, some or all of the steps may be performed sequentially, such as sequentially notifying (602, 622) each observer logic 218a, 218b and starting (606, 626) each client-side memory access in a sequence of operations, such as a loop. In other examples, some or all of the steps (602, 622, 606, 626) may be "chained" together such that they may be submitted to the communication interface 330 together but would execute in sequence, such as with chained RDMA work requests. For example, the step to notify (602) the first observer logic 218a of the pending multi-write operation may be chained to the step to start (606) the client-side memory access against the first region 218a.

Upon starting (606, 626) the client side memory access operations against each region for the multi-write operation, the client logic 312 may wait (608, 628) for the client side memory access operations (606, 626) to complete. In examples where some steps are performed concurrently, waiting (608, 628) for the client-side memory access operations (606, 626) to complete may include synchronizing with the concurrent operations, such that all concurrent operations are complete upon being finished waiting (608, 628). Upon waiting (608, 628) for the client side memory access operations (606, 626) to complete, the client logic 312 may optionally notify (610, 630) the corresponding observer logics 218a 218b of the completed multi-write operation.

Notifying (610, 630) the observer logics 218a 218b of the completed multi-write operation may include sending a multi-write completed notification message to corresponding observer logics 218a 218b. Alternatively or in addition, notifying the observer logics 218a 218b of the completed multi-write operation may include performing a client-side memory access operation to write some data to the memory 210 of the corresponding memory appliances 110 (which correspond to the corresponding observer logics 218a 218b), such that the corresponding observer logic 218a 218b may observe the written data as needed. For example, the client logic 312 may perform a client-side memory access write operation to write data to the pending multi-writes region within the memory of the corresponding memory appliance 110.

The completed multi-write notification message and/or the data written to the memory 210 of the memory appliance 110 may indicate to the corresponding observer logic 218a 218b or provide the corresponding observer logic 218a 218b with, for example: a unique identifier associated with the multi-write operation, the type of operation(s) that are completed, the region(s) 214 on which the operations have been performed, the location within the region(s) 214 where the operations have been performed, the size of the data on which the operation(s) have been performed, and/or any other attributes of the operation(s) that have been performed. In one example, the client logic 312 may overwrite one or more pieces of data that were written while notifying (602, 622) the corresponding observer logics 218a 218b of the multi-write operation. For example, the client logic 312 may overwrite an entry in the pending multi-writes region. Overwriting the entry in the pending multi-writes region may prevent the observer logic 218a 218b from observing that the multi-write operation had been underway.

In response to being notified of the completed multi-write operation, zero or more of the corresponding observer logics 218a 218b may optionally react (612, 632) by taking one or more actions. An action may include, for example, aggregating statistics regarding the operation(s) performed, tracking portions of the region 214 that have been written to or read from, and/or some other action related to the operation(s).

Upon completion of waiting (608, 628) for the client side memory access operations (606, 626) to complete and/or any of the described optional activities (610, 612, 630, 632), the multi-write operation may be complete. Although specific steps are illustrated in FIG. 6, additional, fewer, or different steps may be included. For example, steps (610), (612), (630), and (632) may not be included. In another example, only the client-side memory access operations (606, 626) may be performed. In addition, the steps may be performed in an order different than illustrated.

Also, although the specific example illustrated in FIG. 6 shows the client logic 312 performing a multi-write operation against two regions 214 with their corresponding observer logics 218a 218b, it should be clear to one skilled in the art that the same or similar operations can be performed against more or fewer regions 214, such as by performing the steps illustrated for the first region/first observer logic 218a against each of the regions 214/observer logics 218 to be acted upon for the multi-write operation. Also, in some examples where two or more regions 214 involved in the multi-write operation are included in the same memory appliance 110, the two or more regions 214 may share one or more observer logics. For example, there may be a single observer logic for all regions 214 of the memory appliance 110. In these examples, the observer logic for the first region 218a and the observer logic for the second region 218b may be the same entity (the single observer logic), but the single observer logic may act upon the first region when acting as the observer logic for the first region 218a and/or may act upon the second region when acting as the observer logic for the second region 218b. Alternatively, the observer logic for the first region 218a and the observer logic for the second region 218b may be separate entities.

Performing the multi-write operation may enable the system to achieve synchronous data resiliency. Synchronous data resiliency may be achieved where write operations don't complete until after the data has been made resilient across a specific set and/or number of resiliency set members, such as the critical number of regions 520. Synchronous data resiliency may be advantageous for application logics 314 which may prefer lower (such as zero) lag in building resiliency for the data with other destinations (such as other memory appliances 110) and/or which may better tolerate higher and/or more consistent latency for typical read/write operations. It would be clear to one skilled in the art that the specific examples described herein help to minimize latency and latency variability while maintaining synchronous data resiliency.

Figure 7:
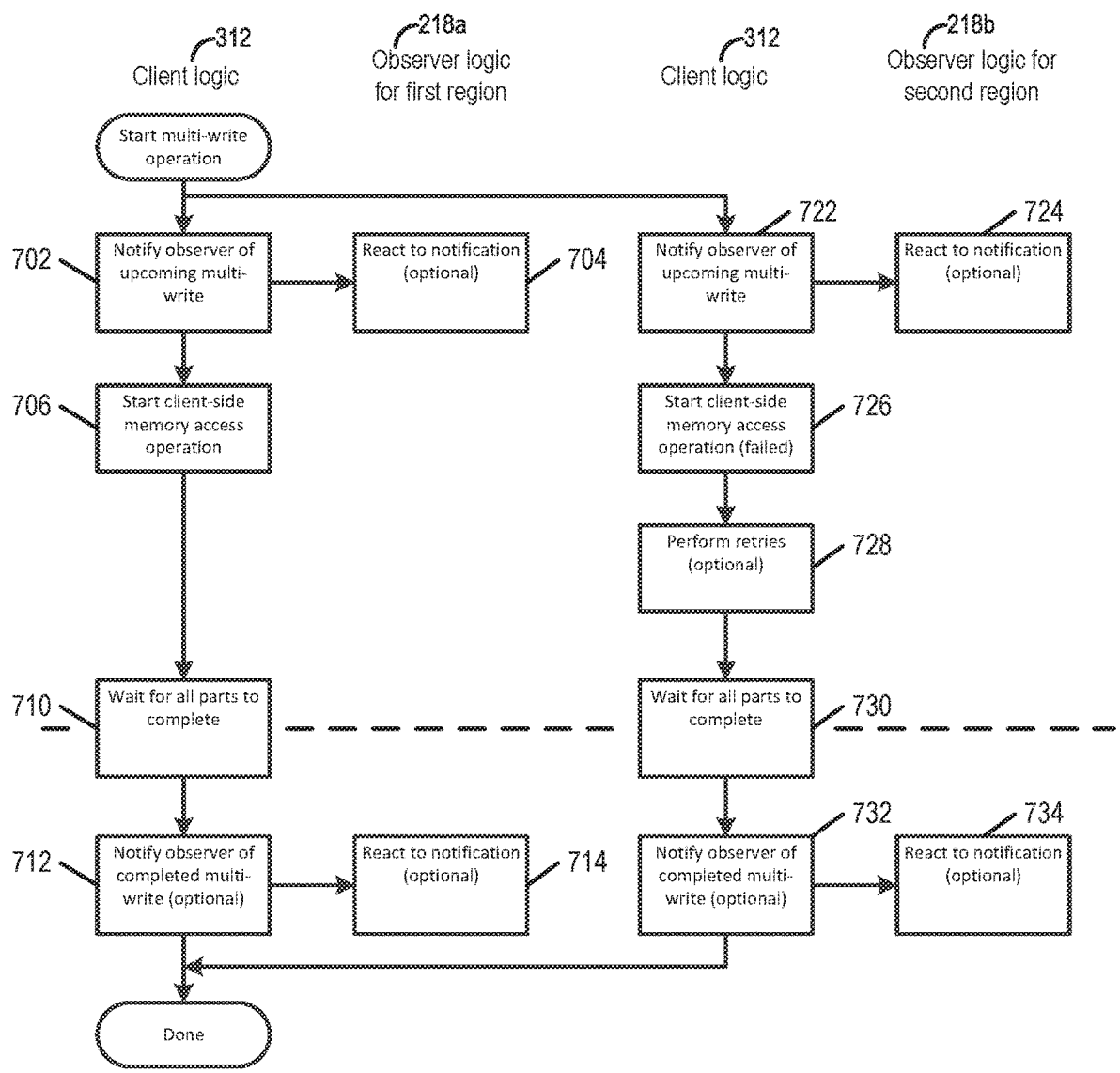
FIG. 7 illustrates an example multi-write operation with error handling.

FIG. 7 illustrates an example multi-write operation with error handling. As in FIG. 6, the client logic may begin by notifying (702, 722) one or more observer logics of the multi-write operation, such as a first observer logic 218a and a second observer logic 218b. In response to being notified (702, 722), each of the one or more observer logics may optionally react (704, 724) by taking one or more actions, such as described for FIG. 6.

After notifying (702, 722) each of the one or more observer logics of the multi-write operation, the client logic 312 may proceed by starting (706, 726) a client-side memory access operation against each corresponding region 214, such as a first region which corresponds to the first observer logic 218a and a second region which corresponds to the second observer logic 218b.

In some examples, such as illustrated in FIG. 7, one or more client-side memory access operations (726) may fail. In other examples, notifying (702, 722) one or more observer logics may fail. The client logic 312 may optionally perform (728) zero or more retry operations until the failed operation succeeds and/or until some condition is met, such as a maximum number of retries being exceeded and/or a timeout occurring.

Upon starting the client side memory access operations (706, 726) against each region for the multi-write operation and/or any optional retries (728), the client logic 312 may wait (710, 730) for the client side memory access operations (706, 726) and/or retries (728) to complete. Upon waiting (710, 730) for the client side memory access operations (706, 726) and/or retries (728) to complete, the client logic 312 may optionally notify (712, 732) the corresponding observer logics 218a 218b of the completed multi-write operation. Notifying (712, 732) the corresponding observer logics 218a 218b of the completed multi-write operation may include indications of any operations and/or retries that failed. For example, the failure indications may indicate that one or more client-side memory access operations failed (726) but were successfully retried (728). In another example the failure indications may indicate that one or more client-side memory access operations failed (726) and were not successfully retried (728). In another example, the failure indications may indicate that one or more attempts and/or retries to notify one or more observer logics of the pending multi-write operation failed. In another example, the failure indications may summarize the success and/or failure of operations for each region. For example, the failure indications may indicate the multi-write failed to complete against the second region.

In response to being notified (712, 732) of the completed multi-write operation, zero or more of the corresponding observer logics 218a 218b may optionally react (714, 734) by taking one or more actions, such as described for FIG. 6. Alternatively or in addition, the corresponding resiliency logics 216 may react by taking one or more actions. The resiliency logic 216 may be notified by the observer logic 218 and/or resiliency logic 216 may observe and/or receive the notification from the client logic 312 directly. The one or more actions taken by the resiliency logic 216 may include coordinating with zero or more other resiliency logics 216 to change the status of one or more regions 214 corresponding to failed operations as indicated by the completed multi-write operation. Coordinating with zero or more other resiliency logics 216 may include notifying the other resiliency logics 216 of operations that failed (726) and/or the corresponding regions 214 upon which operations have failed. For example, the resiliency logic 216 may notify the resiliency logic cluster leader that operations have failed against the region 214. In another example, the resiliency logic 216 may notify all connected resiliency logics 216. Changing the status may include sending the resiliency set notification 510 from one or more resiliency logics 216 to one or more client logics 312, wherein the resiliency set notification 510 indicates that the corresponding regions 214 are degraded and/or unavailable. In one example, the resiliency logic cluster leader may send the resiliency set notification 510 to all connected client logics 312. In another example, all resiliency logics 216 may send the resiliency set notification 510 to all connected client logics 312.

One or more resiliency logics 216 may use one or more data structures to track failed operations of completed multi-write operations. For example, the resiliency logic 216 may keep a list of failed operations. Alternatively or in addition, the one or more resiliency logics 216 may use one or more data structures to track corresponding portions of the corresponding regions 214 upon which operations have failed. In one example, the resiliency logic 216 may keep a list, tree, or any other data structure with entries describing the portions. In another example, the resiliency logic 216 may keep a bitmask and/or a set of flags corresponding to fixed-sized portions (such as pages and/or groups of pages) which include and/or overlap with the portions corresponding to the failed operations. The one or more data structures used for any of these purposes may be considered resiliency tracking data structures.

The resiliency tracking data structures may be associated with one or more regions 214. For example, the resiliency tracking data structures may track failed operations against the region 214 corresponding to the resiliency logic 216 which may keep the resiliency tracking data structures. Alternatively, or in addition, the resiliency tracking data structures may track failed operations against other regions 214. In one example, the resiliency logic cluster leader may use the resiliency tracking data structures to track which portions of each region 214 of the resiliency set are out-of-sync with the rest of the regions 214, such as due to failed operations indicated in completed multi-write operations. Alternatively or in addition, other resiliency logics 216 (such as the resiliency logics 216 associated with fully-synchronized regions) may keep and/or use resiliency tracking data structures to track which portions of each region 214 of the resiliency set are out-of-sync with the rest of the regions. In some examples, all resiliency logics 216 may keep and/or use resiliency tracking data structures to track which portions of each region 214 of the resiliency set are out-of-sync with the rest of the regions 214.

In examples where multiple resiliency logics 216 keep and/or use the resiliency tracking data structures, the resiliency logics 216 may coordinate with each other to reach consensus regarding which portions of each region 214 of the resiliency set are out-of-sync with the rest of the regions 214. In some examples, the resiliency logics 216 may use a leader election logic and/or coordinator election logic to facilitate reaching consensus. For example, the resiliency logics 216 may use a Paxos protocol to reach consensus regarding which portions of each region 214 of the resiliency set are out-of-sync with the rest of the regions 214. In examples where the resiliency logics 216 reach a consensus that all regions are out-of-sync for a portion, such as if a multi-write operation was started but failed to complete against any region, the resiliency logics 216 may select a single region to be considered synchronized for the portion. For example, the resiliency logics 216 may select the master region.

Figure 8:
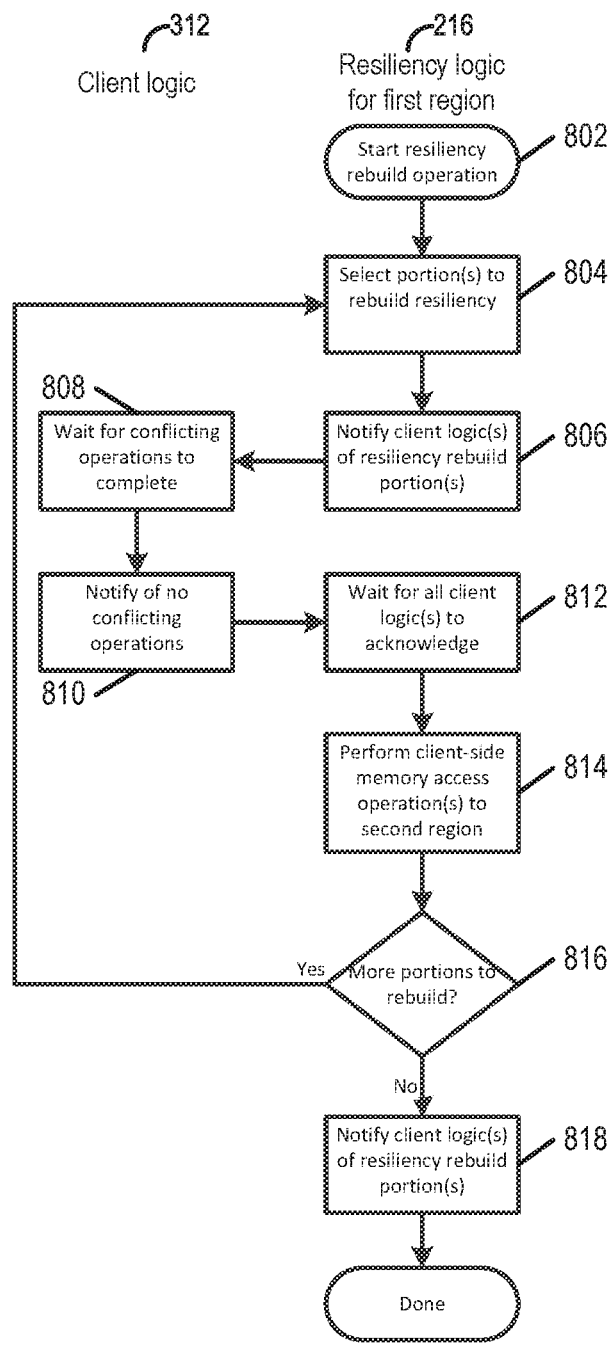
FIG. 8 illustrates an example resiliency rebuild operation.

FIG. 8 illustrates an example resiliency rebuild operation. In response to one or more completed multi-write operations and/or as the result of forming consensus regarding which portions of each region 214 of the resiliency set are out-of-sync with the rest of the regions 214 of the resiliency set, the resiliency logic 216 may start (802) a resiliency rebuild operation. Upon starting (802) the resiliency rebuild operation, the resiliency logic 216 may select (804) one or more portions to rebuild resiliency. The portion(s) to rebuild resiliency may include one or more portions identified by one or more completed multi-write operations and/or other sources, such as by the resiliency tracking data structures and/or as the result of forming consensus regarding which portions of each region 214 of the resiliency set are out-of-sync with the rest of the regions 214.

Upon selecting (804) one or more portions to rebuild resiliency, the resiliency logic may notify (806) one or more client logics 312 of one or more portions to rebuild resiliency. The one or more client logics notified (806) may include client logics 312 in communication with the resiliency logic 216, with the corresponding region access logic 212, and/or with the corresponding observer logic 218. Alternatively or in addition, the one or more client logics notified (806) may include client logics 312 which are in communication with any of the resiliency logics 216, region access logics 212, and/or observer logics 218 corresponding to any of the regions of the resiliency set. In notifying (806) the one or more client logics 312, the resiliency logic 216 may identify the chosen portion(s) to rebuild resiliency. In notifying (806) the one or more client logics 312, the resiliency logic 216 may explicitly or implicitly notify the one or more client logics of other portions that are not selected for rebuilding resiliency and/or that are no longer involved in resiliency rebuilding. For example, if previously the resiliency logic 216 had notified the one or more client logics 312 of one or more other portions to rebuild resiliency, the resiliency logic 216 may notify the client logics 312 that the other portions are no longer involved in resiliency rebuilding. Alternatively or in addition, the act of notifying (806) the one or more client logics 312 of one or more portions to rebuild resiliency without re-notifying regarding the other portions may imply to the one or more client logics 312 that the other portions are no longer involved in resiliency rebuilding.

Upon being notified (806) of one or more portions to rebuild resiliency, each client logic 312 may wait (808) for conflicting operations to complete. For example, if the client logic 312 has a multi-write operation in progress which affects one or more of the portions to rebuild resiliency, the client logic 312 may (808) wait for the multi-write operation to complete. The client logic 312 may or may not consider overlapping read operations to be conflicting operations. For example, the client logic 312 may consider read operations that started before being notified to be consistent and/or correct, if for example the application logic 314 assumes that any operations requested concurrently may complete in arbitrary order and/or that any read operations may return the data of the resiliency set from before, during, or after any concurrent write operations.

Upon waiting (808) for conflicting operations to complete (or upon being notified (806) of one or more portions to rebuild resiliency, if there are no conflicting operations), the client logic 312 may notify (810) the resiliency logic 216 that there are no conflicting operations in progress. Notifying (810) the resiliency logic 216 that there are no conflicting operations in progress may take the form of an explicit notification. Alternatively or in addition, notifying (810) the resiliency logic 216 that there are no conflicting operations in progress may take the form of an implicit notification, such as acknowledging the notification (806) of one or more portions to rebuild resiliency. In some examples, the client logic 312 may both immediately acknowledge the notification of one or more portions to rebuild resiliency and later explicitly notify (810) the resiliency logic 216 that there are no conflicting operations in progress. The acknowledgement may include additional information such as a value representing the number of conflicting operations and/or a value representing the expected time for the operations to complete.

Also upon being notified (806) of one or more portions to rebuild resiliency, each client logic 312 may defer starting new conflicting operations until being notified that the resiliency rebuild is no longer in progress. Alternatively or in addition, each client logic 312 may request permission to perform the new conflicting operation, such as illustrated for FIG. 9.

The resiliency logic 216 may wait (812) for each client logic 312 to notify it that there are no conflicting operations in progress. New conflicting operations (such as those for which the client logic 312 requested permission to perform) may be not considered when determining whether there are no conflicting operations in progress. Upon being notified (810) by each client logic 312 that there are no conflicting operations in progress, the resiliency logic 216 may perform (814) one or more client-side memory access operations to rebuild resiliency for the one or more portions and/or for a subset of the one or more portions. The operations performed (814) and/or the portions and/or subset of the portions upon which the operations are performed may be based upon the logical relationship between the regions of the resiliency set.

In examples where the logical relationship is a mirroring logical relationship, the operations performed (814) may include replicating data from a region 214 where the portion is considered up-to-date (an up-to-date portion) with the resiliency logic 216 to a region 214 where the portion is not considered up-to-date (a non-up-to-date portion). Replicating the data from the up-to-date portion to the non-up-to-date portion may be performed by writing the data from the memory 210 of the up-to-date portion to the memory 210 of the non-up-to-date portion and/or may be performed by reading the data from the memory 210 of the up-to-date portion to the memory 210 of the non-up-to-date portion. Whether to read and/or write may be determined based on which logic is replicating the data. For example, if the resiliency logic 216 of a fully-synchronized region is replicating the data, it may write the data from a portion of its region 214 to a corresponding portion of a degraded region 214.

In examples where the logical relationship is a parity-based logical relationship or any other logical relationship where different data is stored in each region 214 to achieve redundancy, the operations performed (814) may include reading data from one or more up-to-date portions, performing one or more calculations to rebuild appropriate values for one or more non-up-to-date portions, and/or writing the appropriate values to the one or more non-up-to-date portions.

The one or more client-side memory access operations to rebuild resiliency may be optionally sub-divided into multiple steps and/or sub-portions. For example, the one or more portions selected for rebuilding resiliency may be larger than would be practical and/or appropriate to do in a single client-side memory access operation, such as if the client-side memory access operation would take considerably longer than a typical client-side memory access operation that the client logic would perform. In some of these examples, the resiliency logic 216 may iteratively select one or more sub-portions of the one or more portions and perform (814) the client-side memory access operations upon the sub-portions until all of the one or more selected portions have been rebuilt. This approach has the advantage of allowing for other operations to proceed where they otherwise might conflict, such as operations from the client logic that request permission to proceed and/or which only conflict with some of the sub-portions. For example, the resiliency logic 216 may select sub-portions that do not conflict with in-progress operations from the client, such as those that may request permission to proceed. In other examples, the resiliency logic 216 may wait to select sub-portions which do conflict with in-progress operations from the client until the in-progress operations complete and/or until the resiliency logic 216 is notified that the in-progress operations are complete.

Upon performing (814) the one or more client-side memory access operations, the resiliency logic 216 may determine (816) if there are any more portions to rebuild resiliency. If so, the resiliency logic 216 may select (804) another one or more portions to rebuild resiliency. If not, the resiliency logic 216 may notify (818) one or more client logics 312 of zero or more portions to rebuild resiliency. Similar to as described for step (806), in notifying (818) the one or more client logics 312, the resiliency logic 216 may explicitly or implicitly notify the one or more client logics 312 of other portions that are not selected for rebuilding resiliency and/or that are no longer involved in resiliency rebuilding.

Upon notifying (818) the one or more client logics 312, the resiliency rebuild operation may be complete. Although specific steps are illustrated in FIG. 8, additional, fewer, or different steps may be included. For example, if there are no conflicting operations, the client logic 312 may not wait (808) for any to complete. In another example, if there are no client logics 312 to notify, the resiliency logic 216 may not notify (806) any client logics 312 of the one or more resiliency rebuild portions or wait for acknowledgement. In another example, only the client-side memory access operation(s) (814) may be performed. In addition, the steps may be performed in an order different than illustrated. For example, the resiliency logic 216 may notify (818) the one or more client logics 312 of the one or more portions that are no longer involved in resiliency rebuilding prior to determining (816) if there are any more portions to rebuild resiliency.

Figure 9:
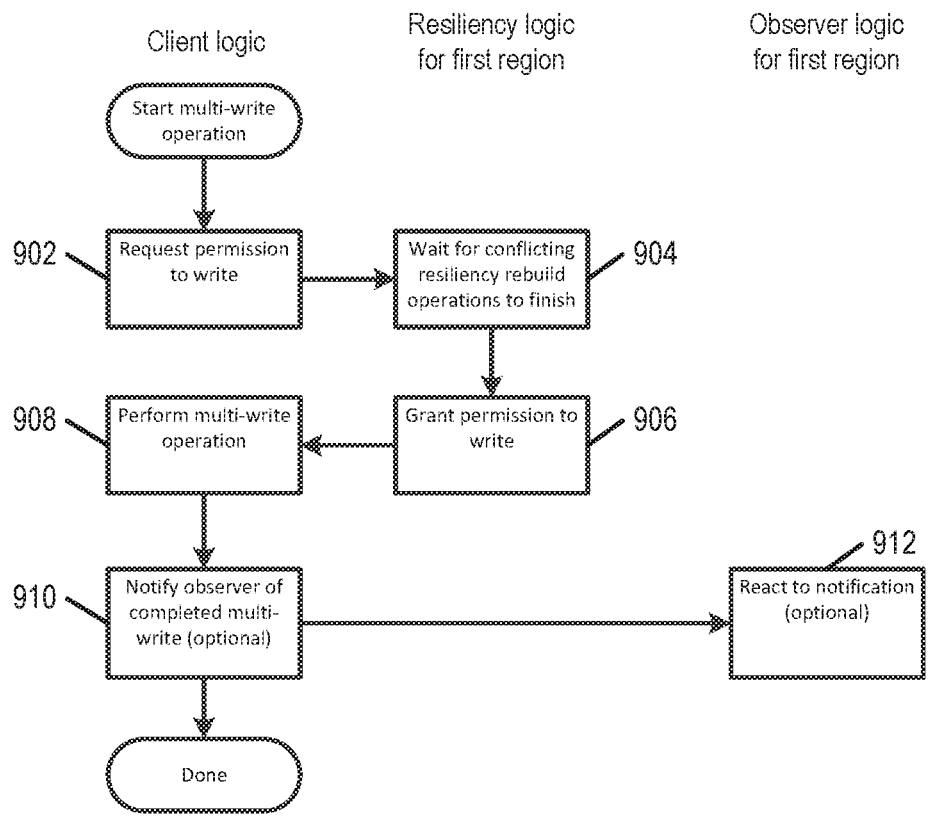
FIG. 9 illustrates an example multi-write operation with a request for permission.

FIG. 9 illustrates an example multi-write operation with a request for permission. The client logic 312 may perform the multi-write operation with request for permission, if for example, the portion to write would conflict with one or more portions to rebuild resiliency as previously notified (806) by one or more resiliency logics 216. The client logic 312 may begin by requesting (902) permission to write to the portion. Requesting (902) permission to write to the portion may be explicit, such as by sending a write-request message to the resiliency logic 216. Alternatively or in addition, requesting (902) permission to write to the portion may be implicit, such as by attempting to perform a client-side memory access write operation for the portion.

In examples where requesting (902) permission to write to the portion is implicit by attempting to perform a client-side memory access write operation for the portion, the client-side memory access operation may be performed later in the operation, such as one or more of the write operations performed during the multi-write operation (908). Also in examples where requesting (902) permission to write to the portion is implicit by attempting to perform a client-side memory access write operation for the portion, the region access logic 212 or another logic of the memory appliance 110 including the region 214 may configure the communication interface 230 to treat one or more portions as not present and/or write-disallowed, such as described in U.S. non-provisional patent application Ser. No. 14/854,657, filed Sep. 15, 2015, entitled "PAGING OF EXTERNAL MEMORY", which is hereby incorporated by reference. In these cases, the resiliency logic 216 or another logic, such as the region access logic 212, may be triggered by the implicit permission request via a page fault with the communication interface 230.

Upon the client logic 312 requesting (902) permission to write to the portion, the resiliency logic 216 may wait (904) for conflicting resiliency rebuild operations to complete, such as the resiliency rebuild operations illustrated in FIG. 8. If there are no conflicting resiliency rebuild operations, the resiliency logic 216 may not wait (904). Upon waiting (904) for conflicting resiliency rebuild operations to complete (if any), the resiliency logic 216 may grant (906) permission to write to the portion. Granting (906) permission to write to the portion may be explicit, such as by sending a response to the request for permission. Alternatively or in addition, granting (906) permission to write to the portion may be implicit, such as by allowing the client-side memory access write operation to proceed for the portion. Allowing the client-side memory access write operation to proceed for the portion may be done by configuring the communication interface 230 to treat the portion as present and/or write-allowed, such as described in U.S. non-provisional patent application Ser. No. 14/854,657, filed Sep. 15, 2015, entitled "PAGING OF EXTERNAL MEMORY", which is hereby incorporated by reference.

Upon being granted (906) permission to write to the portion, the client logic 312 may perform (908) the multi-write operation, such as illustrated in FIG. 6.

Upon completion of the multi-write operation, the client logic 312 may optionally notify (910) one or more observer logics 218 of the completed multi-write operation. Notifying (910) the corresponding observer logics 218 of the completed multi-write operation may take the same form as notifying (610, 630, 712, 732) the corresponding observer logics 218a 218b of the completed multi-write operation as described for FIG. 6 and/or FIG. 7. Alternatively or in addition, notifying (910) the corresponding observer logics 218 of the completed multi-write operation may include indications of any operations and/or retries that succeeded.

In response to being notified (910) of the completed multi-write operation, zero or more of the corresponding observer logics may optionally react by taking (912) one or more actions, such as described for FIG. 6 and/or FIG. 7 for steps (612), (632), (714), and/or (734). Alternatively or in addition, the corresponding resiliency logics 216 may react by taking one or more actions. The resiliency logic 216 may be notified by the observer logic 218 and/or it may observe and/or receive the notification from the client logic 312 directly. The one or more actions taken by the resiliency logic 216 may include coordinating with zero or more other resiliency logics 216 to change the status of one or more regions 214 corresponding to failed operations as indicated by the completed multi-write operation. Alternatively or in addition, coordinating with zero or more other resiliency logics 216 may include updating the resiliency tracking data structures to reflect the success and/or failure to complete the multi-write operation against each region indicated therein. For example for portions of the region 214 which are indicated by the multi-write completed notification to have succeeded, the resiliency logic 216 may update the resiliency tracking data structures to treat the portions as up-to-date. Alternatively or in addition, the actions taken may include allowing resiliency rebuild operations to proceed and/or complete against the portions affected by the multi-write operation. In some examples, if the resiliency tracking data structures are updated to treat the portions as up-to-date, the resiliency logic 216 may consider any pending resiliency rebuild operations for the portions to be complete.

Upon completion of waiting (608, 628, 710, 730) for the client side memory access operations to complete and/or any of the described optional activities (610, 612, 630, 632, 712, 714, 732, 734, 910, 912), the multi-write operation with request for permission may be complete.

Although specific steps are illustrated in FIG. 9, additional, fewer, or different steps may be included. For example, if there are no conflicting resiliency rebuild operations, the resiliency logic 216 may not wait (904) for any to complete. In another example, only the multi-write operation may be performed (908). In addition, the steps may be performed in an order different than illustrated. In another example, notifying (910) the one or more observer logics 218 of the completed multi-write notification and/or reacting (912) to the notification may be performed instead of and/or in-place-of the corresponding steps of notifying (610, 630, 712, 732) the one or more observer logics of the completed multi-write notification and/or reacting (612, 632, 714, 734) to the notification as illustrated for the multi-write operation in FIG. 6 and/or FIG. 7. In another example, one or more of the steps of notifying (610, 630, 712, 732) the one or more observer logics of the completed multi-write notification and/or reacting (612, 632, 714, 734) to the notification as illustrated for the multi-write operation in FIG. 6 and/or FIG. 7 would be performed, and the steps of notifying (910) the one or more observer logics 218 of the completed multi-write notification and/or reacting (912) to the notification as illustrated in FIG. 9 would not be performed.

The client logic 312, the resiliency logic 216, and/or the region access logic 212 may use the same mechanism as and/or a similar mechanism to that illustrated in FIG. 9 to delay and/or defer other operations, such as other client side memory access operations. For example, the client logic 312 may monitor information published by the region access logic 212 related to the amount of data which has been written to one or more regions 214 of the memory appliance 110 but which may not have been made persistent (e.g. dirty data), such as by copying to the backing store 260. If the amount of dirty data is above a dirty threshold, the client logic 312 may request (902) permission to write to portions of the region 214 instead of and/or prior to performing the client-side memory access write. Doing so may enable the system to limit the amount of dirty data to the dirty threshold. The dirty threshold may be adjusted to accommodate the status of parts of the system, such as the measured performance of the backing store 260, the status of the power supply serving the memory appliance 110, the status of the battery and/or UPS serving the memory appliance 110, and/or any other status. For example, as the battery discharges, the dirty threshold may be lowered to increase the probability that the dirty data may be made persistent before the battery is depleted.

Figure 10A:
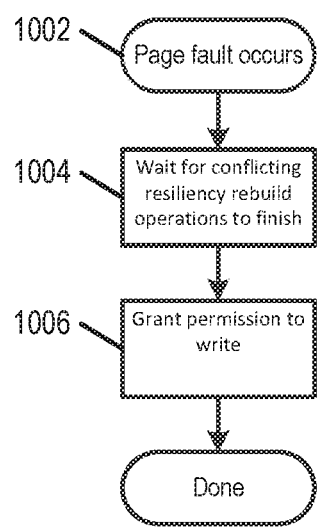
FIG. 10A illustrates an example multi-write operation delayed by a page fault.

FIG. 10A illustrates an example multi-write operation delayed by a page fault. In examples where requesting permission to write to the portion is implicit by attempting to perform a client-side memory access write operation for the portion, attempts to write to one or more portions marked not present and/or write-disallowed may generate (1002) a page fault with the communication interface 230 of the memory appliance 110. In response to the page fault (1002) and/or upon request by a page fault handler logic, the resiliency logic 216 may wait (1004) for conflicting resiliency rebuild operations to finish, such as the resiliency rebuild operations illustrated in FIG. 8. If there are no conflicting resiliency rebuild operations, the resiliency logic 216 may not wait (1004). Upon waiting (1004) for conflicting resiliency rebuild operations to complete (if any), the resiliency logic 216 may grant (1006) permission to write to the portion(s). Granting (1006) permission to write to the portion(s) may be as described elsewhere in this document, such as by allowing the client-side memory access write operation to proceed for the portion and/or by configuring the communication interface 230 to treat the portion(s) as present and/or write-allowed. Upon granting permission to write to the portion(s), the page fault handling may be complete, allowing the multi-write operation to proceed.

Figure 10B:
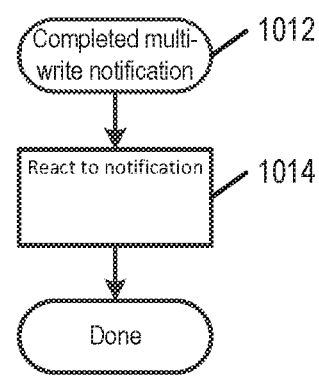
FIG. 10B illustrates an example notification of a completed multi-write operation, for multi-write operations delayed by a page fault.

FIG. 10B illustrates an example notification of a completed multi-write operation, for multi-write operations delayed by a page fault. In response to being notified (1012) of a completed multi-write operation, zero or more of the corresponding observer logics 218 may react (1014) by taking one or more actions, such as described for FIG. 6 and/or FIG. 7. Alternatively or in addition, the corresponding resiliency logics 216 may react (1014) by taking one or more actions as described for FIG. 9. In examples where the resiliency tracking data structures are updated in response to the example notification of a completed multi-write operation, the resiliency logics 216 may configure the communication interface 230 to treat the corresponding portion(s) as not present and/or write-disallowed if the resiliency tracking data structures indicate that the portion(s) are not up-to-date. Upon reacting (1014) to being notified of the completed multi-write operation, the handling of the completed multi-write operation notification may be complete.

Figure 11:
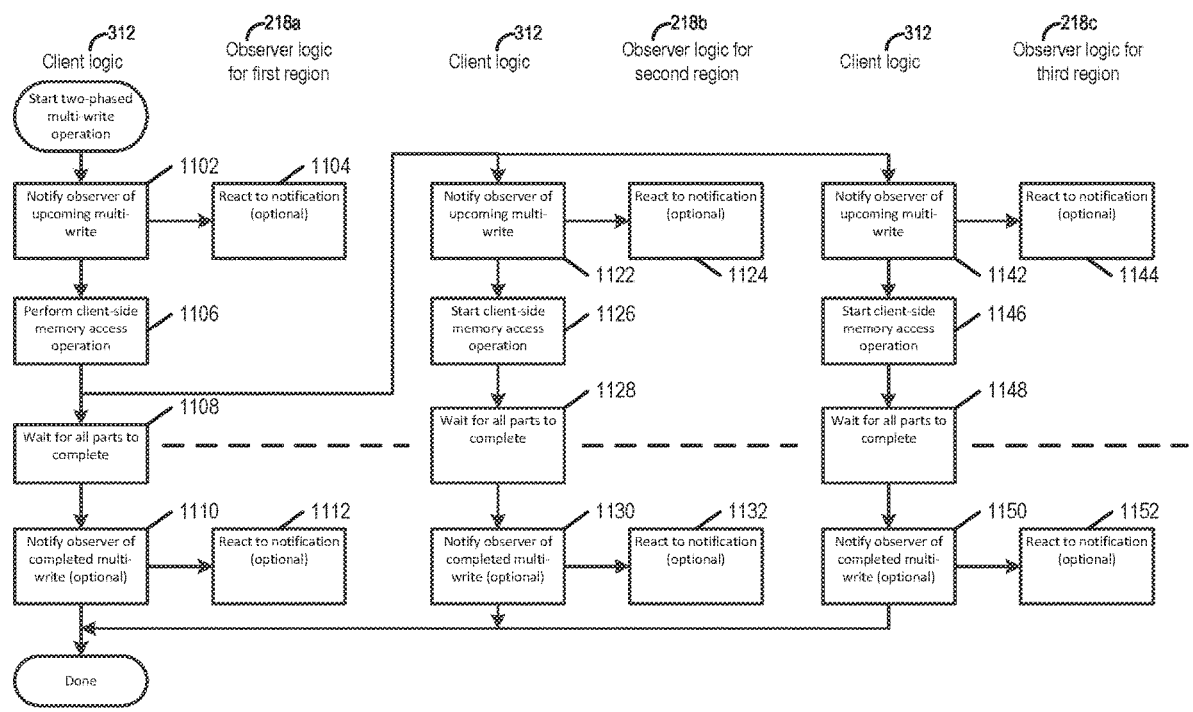
FIG. 11 illustrates an example two-phased multi-write operation.

FIG. 11 illustrates an example two-phased multi-write operation. The two-phased multi-write operation may begin by the client logic 312 notifying a first observer logic 218a, such as described for notifying (602) the first observer logic 218a of FIG. 6. In the two-phased multi-write operation, the first observer logic 218a may correspond to a first region and/or to a first resiliency logic. The first resiliency logic may be the resiliency logic cluster leader. Alternatively or in addition, the first observer logic 218a, the first region, and/or the first resiliency logic may be elected by the resiliency logic cluster and/or by other logics of the system to be the observer logic 218, region 214, and/or resiliency logic 216 first notified and/or first written to for two-phased multi-write operations of the resiliency set. The first observer logic 218a, the first region, and/or the first resiliency logic may be elected using any leader election logic and/or method now known or later discovered, such as described elsewhere in this document.

In response to being notified, the first observer logic 218a may optionally react (1104) by taking one or more actions, such as described for FIG. 6.

After notifying (1102) the first observer logic 218a of the multi-write operation, the client logic 312 may proceed by performing (1106) a client-side memory access operation against the first region, such as described for FIG. 6.

After performing (1106) the client-side memory access operation against the first region, the client logic 312 may proceed by notifying (1122, 1142) zero or more other observer logics of the multi-write operation, such as an observer logic 218b for a second region and/or an observer logic 218c for a third region. In response to being notified (1122, 1142), each of the zero or more other observer logics 218b 218c may optionally react (1124, 1144) by taking one or more actions, such as described for FIG. 6.

After notifying (1122, 1142) each of the zero or more other observer logics 218b 218c of the multi-write operation, the client logic 312 may proceed by starting (1126, 1146) a client-side memory access operation against each corresponding region, such as the second region and the third region.

Upon starting (1126, 1146) the client side memory access operations against each region for the multi-write operation and/or any optional retries, the client logic 312 may wait (1108, 1128, 1148) for the client side memory access operations and/or retries to complete. Upon waiting (1108, 1128, 1148) for the client side memory access operations and/or retries to complete, the client logic 312 may optionally notify (1110, 1130, 1150) the corresponding observer logics 218a 218b 218c of the completed multi-write operation. In response to being notified (1110, 1130, 1150) of the completed multi-write operation, zero or more of the corresponding observer logics 218a 218b 218c may optionally react (1112, 1132, 1152) by taking one or more actions, such as described elsewhere in this document. Finally, the two-phased multi-write operation may complete.

Example systems that use the two-phased multi-write operation may be advantageous in that these systems may prevent client logics 312 from performing conflicting multi-write operations during resiliency rebuild operations by configuring the communication interface 230 of a single memory appliance 110, such as the memory appliance associated with the first region, to treat the corresponding portions as not present and/or write-disallowed. Accordingly, attempts to perform (1106) the client side memory access operation(s) against the first region may trigger a page fault with the communication interface, if the operation(s) overlap with the portions.

Figure 12:
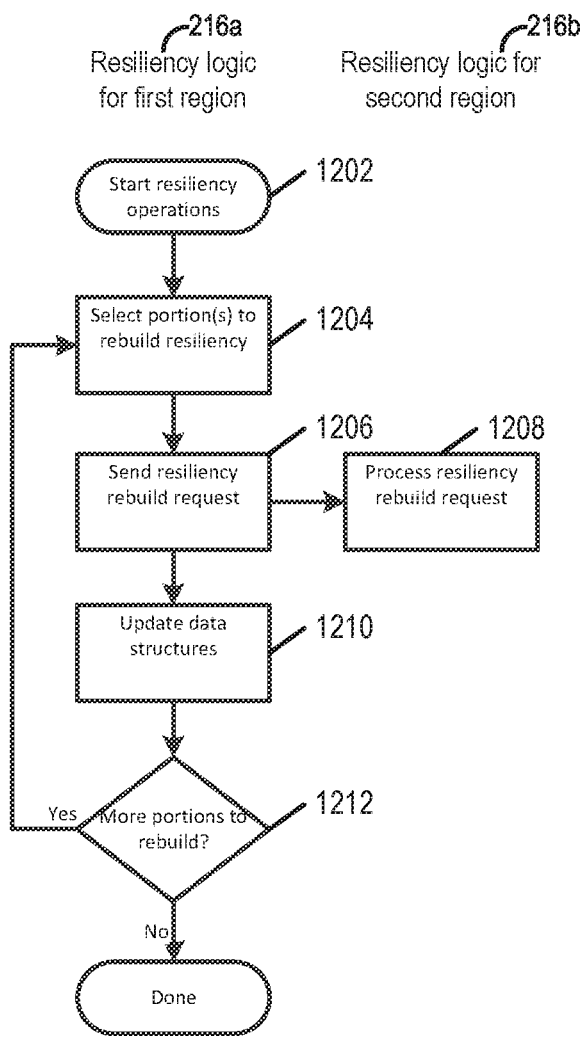
FIG. 12 illustrates an example resilient external memory system performing asynchronous data resiliency operations.

FIG. 12 illustrates an example resilient external memory system performing asynchronous data resiliency operations. Asynchronous data resiliency may be advantageous for application logics 314 which may prefer lower and/or more consistent latency for typical read/write operations and/or which may better tolerate higher lags in building resiliency for the data with other destinations (such as other memory appliances 110). For example, attempts to write data to a region 214 involved in asynchronous data resiliency may complete without waiting for the resiliency operations to start and/or complete. As such, there may be a lag between when data is written to the region 214 and when the data is made resilient with other destinations.

Asynchronous data resiliency operations may be initiated (1202) upon an explicit request, such as a request to initiate asynchronous data resiliency operations from the application logic 314 and/or client logic 312. The request to initiate asynchronous data resiliency operations may indicate one or more portions which are to be made resilient. The request to initiate asynchronous data resiliency operations may be delivered to the first resiliency logic 216a and/or to another logic, such as the observer logic 218, and/or may be delivered by way of another logic, such as the client logic 312. In one example, the application logic 314 may request the client logic 312 initiate asynchronous data resiliency operations upon one or more portions and/or the client logic 312 may request the first resiliency logic 216a to initiate the operations.

Alternatively or in addition, asynchronous data resiliency operations may be initiated (1202) upon an implicit request. For example, the observer logic 218 may observe one or more client-side memory access operations upon one or more portions of a region 214, such as described in U.S. patent application Ser. No. 13/036,544, filed Feb. 28, 2011, entitled "High performance data storage using observable client-side memory access" by Stabrawa, et al., which published as US Patent Application Publication US2012/

0221803 A1, and which is hereby incorporated by reference. Upon observing the client-side memory access operations, the observer logic 218 may request the first resiliency logic 216a to initiate (1202) the operations.

The first resiliency logic 216a may track the state of zero or more portions which are subject to asynchronous data resiliency operations using asynchronous resiliency tracking data structures. The asynchronous resiliency tracking data structures may be the resiliency tracking data structures and/or some other data structures. Examples of other data structures may include a queue of previously requested portions, one or more bitmasks and/or sets of flags corresponding to fixed-sized portions (such as pages and/or groups of pages) which include and/or overlap with the previously requested portions, and/or lists, trees, and/or any other data structures with entries describing the portions.

In some examples, upon receiving a request to initiate asynchronous data resiliency operations, the first resiliency logic 216a may copy the data for the indicated portions to a data staging area. The data staging area may be one or more portions of the memory 210 and/or of the backing store 260 which may hold the data for the indicated portions. The data staging area and/or some other data structures (such as described below) may associate the data for the indicated portions with the corresponding portions. In one example, the data staging area may be organized as a ring buffer in a memory-mapped file, where the file is stored in the backing store 260 but mapped to the one or more portions of the memory 210. Upon copying the data to the data staging area, the first resiliency logic 216a may notify the client logic 312 (or another logic, such as the application logic 314) that the data has been copied to the data staging area. Alternatively or in addition, for status requests received after copying the data to the data staging area, the first resiliency logic 216a may indicate that the corresponding portions have had their data copied to the data staging area.

Copying the data to the data staging area may be advantageous in that the client logic 312 and/or the application logic 314 may overwrite the corresponding portions of the region 214 after the first resiliency logic 216a has indicated that the data has been copied to the data staging area. In other examples, upon receiving a request to initiate asynchronous data resiliency operations, the first resiliency logic 216a may not copy the data for the indicated portions to a data staging area. Not copying the data to the data staging area may be advantageous in that the total time to complete each resiliency rebuild request would be reduced (as would the lag in building resiliency for the data). Whether or not to copy the data to the data staging area may be determined based upon a configuration for the region 214 and/or for the resiliency set. Alternatively or in addition, whether or not to copy the data to the data staging area may be determined independently for each request to initiate asynchronous data resiliency operations. For example, the request may indicate whether the data for the corresponding portions are to be copied to the data staging area. In another example, the configuration for the region 214 and/or for the resiliency set may indicate parameters for which requests are to have data copied to the data staging area. For example, the parameters may indicate that requests overlapping with certain portions, such as portions which hold frequently-changing data, are to have data copied to the data staging area.

Upon initiating (1202) asynchronous data resiliency operations, the first resiliency logic 216a may select (1204) one or more portions to rebuild resiliency. The one or more portions to rebuild resiliency may be selected (1204) based upon the portions identified by the explicit and/or implicit request to initiate the operations. Alternatively or in addition, the one or more portions may be selected (1204) based on other information, such as the asynchronous resiliency tracking data structures. For example, the one or more portions may be identified in the asynchronous resiliency tracking data structures as not having rebuilt resiliency and/or not having sent resiliency rebuild requests for the portions.

Upon selecting (1204) one or more portions to rebuild resiliency, the first resiliency logic 216a may send (1206) one or more resiliency rebuild requests to the resiliency logic(s) for one or more other regions, such as the resiliency logic for a second region 216b. The resiliency rebuild requests may indicate one or more portions to rebuild resiliency, such as the one or more portions to rebuild resiliency as selected (1204). In another example, the one or more portions indicated by the resiliency rebuild requests may be subsets of the selected (1204) portions, may be overlapping with the selected (1204) portions, and/or may include the selected (1204) portions. For example, if the selected (1204) portions are too large to practically rebuild in a single operation without incurring unacceptable communications delays, the selected (1204) portions may be sub-divided to more manageable sizes, such as 512 MiB, 16 MiB, and/or any other size(s).

The resiliency rebuild requests may include the data to be applied to the other regions. The data included in the resiliency rebuild requests may be the data of the region, the data of the data staging area, and/or data derived from either of these locations. For example, if the logical relationship between the regions 214 is a parity-based logical relationship or any other logical relationship where different data is stored in each region 214 to achieve redundancy, the data included in the resiliency rebuild requests may be the result of performing one or more calculations to rebuild appropriate values for the corresponding region 214.

Alternatively or in addition, the resiliency rebuild requests may reference the data to be replicated. In one example, the resiliency rebuild requests may include an identifier, an address, and/or a length referencing a portion of the memory 210 and/or of the backing store 260 upon which the resiliency logics 216b of the other regions may retrieve the data, such as by client-side memory access. In another example, the resiliency rebuild requests may include an identifier, an offset, and/or a length referencing a portion of the region 214 and/or of another region 214 from which the resiliency logics 216b of the other regions may retrieve the data. For example, the resiliency rebuild requests may reference a different portion of the second region which contains the same data which is to be applied at the indicated portions. In another example, the resiliency rebuild requests may indicate that the data of a previously sent resiliency rebuild request are to be re-used for the subsequent resiliency rebuild requests.

Resiliency rebuild requests may be sent over a network, such as the interconnects 140. In examples where the resiliency rebuild requests may travel long physical distances or long network distances, in examples where the resiliency rebuild requests may travel across untrusted networks, and/or for other reasons, such as when configured, the resiliency rebuild requests and/or the data may be encrypted.

In examples where the other regions 214, such as the second region, may be accessible with client-side memory access, the resiliency logic of the first region 216a may perform client-side memory access writes to the other regions 214 instead of sending resiliency rebuild requests.

Alternatively or in addition, the resiliency rebuild requests may be and/or may include client-side memory access writes to the other regions.

Upon receiving a resiliency rebuild request, the resiliency logics of the other regions, such as the resiliency logic of the second region 216b, may process (1208) the resiliency rebuild request. Processing (1208) the resiliency rebuild request may include applying the data included in and/or referenced by the resiliency rebuild request to the one or more portions of the region 214 identified by the resiliency rebuild request. For example, the resiliency logic of the second region 216b may copy the data included in the resiliency rebuild request to the portions of the second region. In another example, the resiliency logic of the second region 216b may perform a client-side memory access operation to read the referenced data from the referenced portions of the first region into the indicated portions of the second region. In another example, the resiliency logic of the second region 216b may copy the data of a previous resiliency rebuild request that is referenced by the current resiliency rebuild request into the indicated portions of the second region. In another example, the resiliency logic of the second region 216b may copy the data from a portion of the second region indicated by the resiliency rebuild request as the source portion into the indicated portion of the second region. Upon processing (1208) the resiliency rebuild request, the resiliency logic of the second region 216b may acknowledge the resiliency rebuild request. In examples where the resiliency rebuild request is a client-side memory access write operation, the resiliency logic of the second region 216b may not process (1208) the resiliency rebuild request at all and/or the resiliency rebuild request may be processed (1208) by the communication interface 230. In examples where processing (1208) the resiliency rebuild request fails to complete successfully, the resiliency logic of the second region 216b may indicate failure when acknowledging the resiliency rebuild request.

Upon sending (1206) the resiliency rebuild request, the first resiliency logic 216a may update (1210) the asynchronous resiliency tracking data structures to indicate that the request was sent (1206) for the corresponding portions. For example, one or more flags may be set and/or cleared to indicate that the request was sent (1206). In other examples, one or more entries may be marked and/or modified, such as by updating their state, to indicate that the request was sent (1206).

After updating the asynchronous resiliency tracking data structures, the first resiliency logic 216a may determine (1212) if there are any more portions to rebuild resiliency. If so, the first resiliency logic 216a may select (1204) another one or more portions to rebuild resiliency. If not, asynchronous data resiliency operations may be complete.

The resiliency logic of the first region 216a may wait for acknowledgement for each resiliency rebuild request at any time during the asynchronous data resiliency operations, such as after sending each resiliency rebuild request and/or after determining that there are not any more portions to rebuild resiliency. Alternatively or in addition, the resiliency logic of the first region 216a may not wait for acknowledgement for each resiliency rebuild request. In some examples, the resiliency logic of the first region 216a may react to acknowledgements for some and/or all resiliency rebuild requests after completing the asynchronous data resiliency operations.

Upon acknowledgement of one or more resiliency logic requests, the resiliency logic of the first region 216a may react to the acknowledgements. For acknowledgements of successful resiliency rebuild requests, the reaction may include actions to mark the corresponding portions as having been made resilient for the corresponding region. If, for example, the portions are resilient for all regions of the resiliency set, the reaction may include marking the corresponding portions as being fully resilient and/or removing the portions from the asynchronous resiliency tracking data structures.

For acknowledgements of unsuccessful resiliency rebuild requests and/or for resiliency rebuild requests for which no acknowledgement is received (such as after a timeout), the reaction may include actions to mark the corresponding portions as not having been made resilient for the corresponding region. Alternatively or in addition, the reaction may include updating the asynchronous resiliency tracking data structures to indicate that no request was sent for the corresponding portions and/or that the request failed. Alternatively or in addition, the reaction may include triggering the asynchronous data resiliency operations, such as illustrated in FIG. 12. The asynchronous data resiliency operations may be triggered immediately and/or after some delay. The delay may be configurable, may be randomized, and/or may be based upon the number of attempts which have failed. The triggered asynchronous data resiliency operations may include retrying the resiliency rebuild requests which were unsuccessful and/or for which no acknowledgement was received. Alternatively or in addition, if for example the resiliency rebuild request is not successful after a maximum number of attempts, the actions may include marking the resiliency rebuild request as failed and/or marking the corresponding portions as having failed to rebuild resiliency.

The application logic 314 and/or client logic 312 may send a status request to the resiliency logic 216, such as the resiliency logic for the first region 216a. The status request may identify one or more portions of one or more regions 214 and/or may identify one or more previously sent requests to initiate asynchronous data resiliency operations. In response to the status request, the resiliency logic 216 may send a status response. The status response may include information for one or more of the portions and/or requests identified by the status request. For example, the status response may include a list of portions and/or requests and/or their corresponding statuses. In one example, the status for a portion and/or for a request may be fully synchronized, such as if the corresponding request(s) have been completed successfully and/or no other requests have been received for the corresponding portions. In another example, the status for a portion and/or for a request may be pending, such as if one or more requests have been received for the portion (such as the indicated request), but the requests haven't been processed yet. In another example, the status for a portion and/or for a request may be staged, such as if the indicated request and/or all requests for the indicated portion(s) which have been received have also had their data copied to the data staging area. In another example, the status for a portion and/or for a request may be in-progress, such as if one or more resiliency rebuild requests have been sent for the corresponding portion(s) and/or request. In other examples, the status for a portion and/or for a request may be a combination of statuses, such as staged and in-progress. In other examples, the status response may indicate one or more errors, such as if the status request identifies an invalid portion and/or request.

Figure 13A:
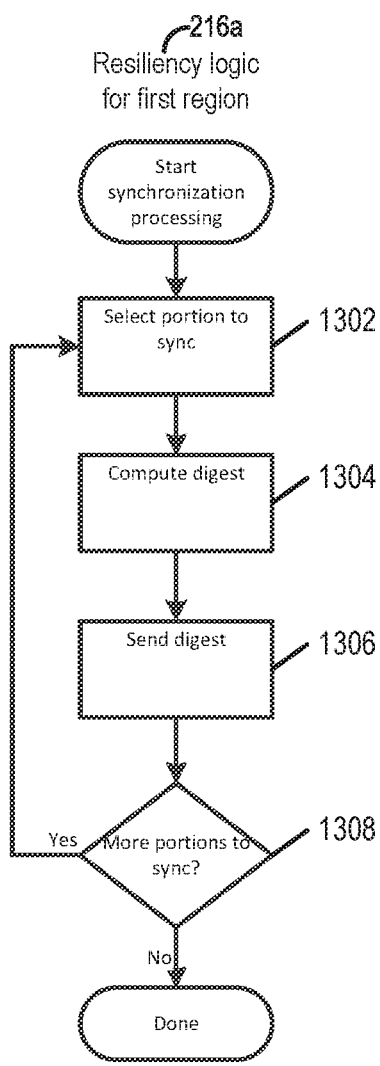
FIG. 13A illustrates an example resilient external memory system performing synchronization of source and target resiliency set members for asynchronous data resiliency.

FIG. 13A illustrates an example resilient external memory system performing synchronization of source and target resiliency set members for asynchronous data resiliency.

Synchronization of source and target resiliency set members may be performed upon creation of a target region, upon selection of a region to be used as the target region, upon inclusion of the target region in the resiliency set, and/or after one or more communication failure and/or memory appliance failures occurs. For example, if the target region has been unreachable for a long time and/or if several requests to initiate asynchronous data resiliency operations did not complete successfully, synchronization of source and target resiliency set members may be performed.

Upon starting synchronization of source and target resiliency set members the resiliency logic for a first region (a first resiliency logic) 216*a*, may select (1302) a portion of the first region to synchronize. Upon selecting (1302) the portion, the first resiliency logic 216*a* and/or another logic, such as a data digesting logic, may compute (1304) a digest for the portion. Upon computing (1304) a digest for the portion, the first resiliency logic 216*a* may send (1306) the digest to a second resiliency logic 216*b*. Upon sending (1306) the digest, the first resiliency logic 216*a* may determine (1308) if there are more portions to synchronize. If there are more portions to synchronize, the resiliency logic may select (1302) another portion of the first region to synchronize. If not, the first resiliency logic may stop performing synchronization of source and target resiliency set members.

The data digesting logic may be a logic which is capable of producing a digest of data. The digest may be smaller than the data and may be consistently computable from the data, given the same data as input. Producing a digest of data may differ from some forms of data translation in that, the data may not be computable from the digest. Multiple combinations of data may exist, such that each would compute to the same digest. The multiple combinations of data may be considered digest collisions. An effective data digesting logic may be designed to minimize digest collisions and/or may minimize digest collisions for input data up to a certain size. Examples of data digests may include checksums, cyclic redundancy check codes, and cryptographic hash codes. In some examples, the data digesting logic may compute multiple digests, such as a digest over multiple sub-portions, and/or may combine multiple digests into fewer digests, such as by computing a digest of the multiple digests. In other examples, the data digesting logic may compute different types of digests over the same portions and/or sub-portions. An advantage of computing different types of digests may be to further minimize digest collisions, especially in examples where different input data may compute to the same digest value for a first digest type but different digest values for a second digest type.

In some examples, such as for resiliency sets with a parity logical relationship or any other logical relationship in which different data is stored in corresponding portions of each region 214, in computing the digest, the data digesting logic may compute a digest for a second region. In one example, the data digesting logic may compute the digest for the second region by first computing the data for the second region based on the contents of the first region and/or one or more other regions (such as the other regions of the resiliency set), and then computing a digest of the computed data.

In some examples, the size of the selected portion may be based upon the capabilities and/or parameters of the data digesting logic. For example, the data digesting logic may be capable of working with portions up to a maximum size and/or may have a reasonably low risk of digest collisions for portions up to a certain size. Alternatively or in addition, the size of the selected portion may be based upon the content of the first region and/or of the selected portion. For example, the data digesting logic may perform data translation (such as compression) prior to computing a digest, which may effectively increase the maximum size of the data digesting logic and/or which may increase the size at which the data digesting logic may have a reasonably low risk of digest collisions.

Figure 13B:
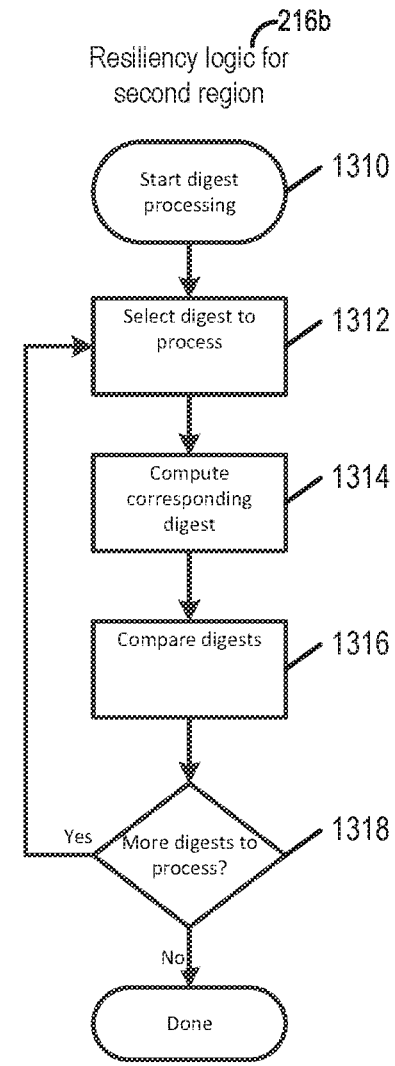
FIG. 13B illustrates an example resilient external memory system processing digests for synchronization of source and target resiliency set members for asynchronous data resiliency.

FIG. 13B illustrates an example resilient external memory system processing digests for synchronization of source and target resiliency set members for asynchronous data resiliency. Processing digests for synchronization of source and target resiliency set members may be triggered (1310) by receiving the digest from the first resiliency logic 216*a* and/or some other event. Alternatively or in addition, processing digests may be triggered (1310) periodically.

Upon starting (1310) processing digests for synchronization of source and target resiliency set members, a resiliency logic for a second region (the second resiliency logic) 216*b* may select (1312) a digest to process. The second region may be the same as the second region as described for FIG. 13A. The digest to process may be one of the digests received that triggered (1310) processing of digests. Alternatively or in addition, the digest to process may be selected from previously received information. For example, the digest to process may be included in a data structure, such as a ring buffer and/or queue of previously received digests.

Upon selecting (1312) the digest to process, the second resiliency logic 216*b* and/or another logic, such as the data digesting logic, may compute (1314) a corresponding digest from the second region. The data digesting logic may use the same logic as the data digesting logic described for FIG. 13A, such that identical data in the first region (or data computed from the first region, in examples having resiliency sets with a parity logical relationship or any other logical relationship in which different data is stored in corresponding portions of each region 214) and the second region would lead to the data digesting logic computing (1304, 1314) identical digests for corresponding portions.

Upon computing (1314) the digest from the second region, the second resiliency logic 216*b* may compare (1316) the digest from the second region with the selected digest. If the compared digests differ, the second resiliency logic 216*b* may send the resiliency rebuild request to the first resiliency logic 216*a*. Alternatively or in addition, the second resiliency logic 216*b* may reply to the first resiliency logic 216*a*. The reply may include digest from the second region and/or an indication of whether or not the compared digests differ. Upon receiving the reply, the first resiliency logic 216*a* may send the resiliency rebuild request to the second resiliency logic, such as if the digest from the second region differs from the selected digest.

Upon comparing (1316) the digests, the second resiliency logic 216*b* may determine (1318) if there are more digests to process. If there are more digests to process, the second resiliency logic may select (1312) another digest to process. If not, the second resiliency logic may stop processing digests for synchronization of source and target resiliency set members.

Although specific steps are illustrated in FIG. 13A and FIG. 13B, additional, fewer, or different steps may be included. For example, steps (1302) and (1304) may be combined. In addition, the steps may be performed in an order different than illustrated. Furthermore, any other technique which enables synchronizing the contents of the regions 214 may be used. For example, the rsync protocol may be used to synchronize source and target regions 214.

In another example, Remote Differential Compression may be used. In other examples, resiliency may be rebuilt for the entire region(s) 214 without regard for whether some portions may already be resilient.

Figure 14:
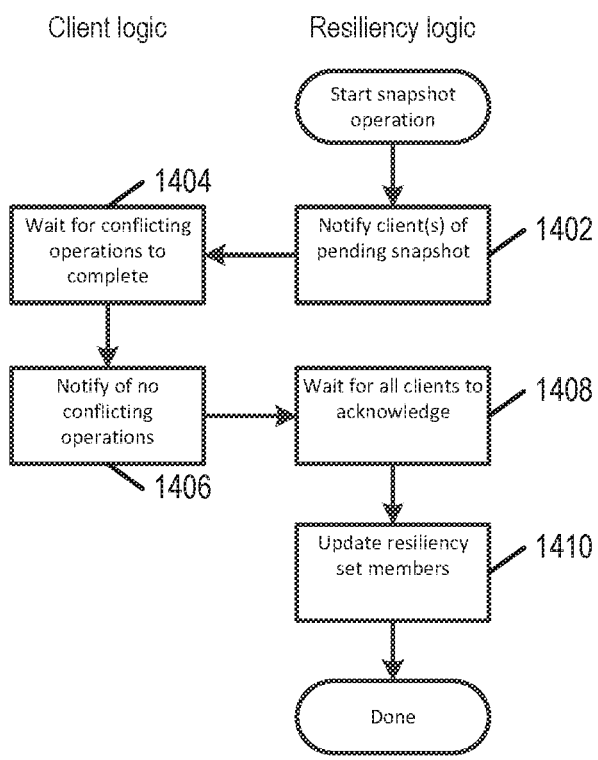
FIG. 14 illustrates an example synchronous data resiliency system performing a data snapshot.

FIG. 14 illustrates an example synchronous data resiliency system performing a data snapshot. The data snapshot may be triggered and/or requested by the application logic 314 and/or another logic. For example, the application logic 314 may request a data snapshot upon completing some amount of work, such as to establish a checkpoint of its progress as represented in the data of the resiliency set. Alternatively or in addition, the data snapshot may be triggered according to a schedule, such as periodically. Upon the data snapshot being triggered and/or requested, the resiliency logic 216 may notify (1402) one or more client logics 312 of the pending snapshot. For example, the resiliency logic 216 may notify (1402) all client logics 312. The client logics 312 may be notified (1402) directly from the resiliency logic 216 or by way of other resiliency logics 216 in the resiliency set. The client logics 312 may be notified of the pending snapshot explicitly, such as by sending a notification of the pending snapshot, and/or implicitly, such as by notifying the client logics 312 of one or more portions to rebuild resiliency. The one or more portions may include the portions of the resiliency set which are to be snapshotted. In some examples, the entire resiliency set may be identified by the one or more portions and/or the notification of the pending snapshot. In other examples, only part of the resiliency set may be identified, such as if the snapshot is only to be performed over part of the resiliency set.

Upon being notified (1402) of the pending snapshot, each client logic 312 may wait (1404) for conflicting operations to complete. For example, if the client logic 312 has a multi-write operation in progress which affects one or more of the portions to rebuild resiliency and/or the part of the resiliency set identified by the notification of the pending snapshot, the client logic 312 may wait (1404) for the multi-write operation to complete. The client logic 312 may or may not consider overlapping read operations to be conflicting operations. For example, the client logic 312 may consider read operations that started before being notified to be consistent and/or correct, if for example the application logic 314 assumes that any operations requested concurrently may complete in arbitrary order and/or that any read operations may return the data of the resiliency set from before, during, or after any concurrent write operations.

Upon waiting (1404) for conflicting operations to complete (or upon being notified (1402) of the pending snapshot, if there are no conflicting operations), the client logic 312 may notify (1406) the resiliency logic 216 that there are no conflicting operations in progress. Notifying (1406) the resiliency logic 216 that there are no conflicting operations in progress may take the form of an explicit notification. Alternatively or in addition, notifying (1406) the resiliency logic that there are no conflicting operations in progress may take the form of an implicit notification, such as acknowledging the notification of the pending snapshot. In some examples, the client logic 312 may both immediately acknowledge the notification of the pending snapshot and later explicitly notify the resiliency logic that there are no conflicting operations in progress. The acknowledgement may include additional information such as a value representing the number of conflicting operations and/or a value representing the expected time for the operations to complete.

Also upon being notified (1402) of the pending snapshot, each client logic 312 may defer starting new conflicting operations until being notified that the snapshot is no longer pending. Alternatively or in addition, each client logic 312 may request permission to perform the new conflicting operation, such as illustrated for FIG. 9.

The resiliency logic 216 may wait (1408) for each client logic 312 to notify (1406) it that there are no conflicting operations in progress. New conflicting operations (such as those for which the client logic 312 requested permission to perform) may be not considered when determining whether there are no conflicting operations in progress.

Upon waiting (1408) for each client logic 312 to notify (1406) it that there are no conflicting operations in progress, the resiliency logic 216 may update (1410) the resiliency set members, such as by sending the resiliency set notification. In updating (141) the resiliency set members, the resiliency logic may select one or more regions 214 of the resiliency set to be regions 214 of a snapshot resiliency set. The resiliency set notification may identify the one or more regions 214 of the snapshot resiliency set as unavailable and/or otherwise indicate that the regions 214 are not to be written to as the original resiliency set. For example, the regions 214 may be marked read-only and/or paused. Alternatively or in addition, the regions 214 may be omitted from the resiliency set notification, such as to indicate that the regions 214 are no longer part of the resiliency set. The resiliency set notification and or a second resiliency set notification may identify the regions 214 as part of the snapshot resiliency set, which may be treated as a new resiliency set by the client logics 312, the resiliency logics 216, the observer logics 218, and/or other logics.

The resiliency set notification and/or the second resiliency set notification may serve to notify the client logics that the pending snapshot is complete. Alternatively or in addition, the resiliency logic 216 may explicitly notify the client logics that the pending snapshot is complete.

Upon sending the resiliency set notification and/or the second resiliency set notification, performing the data snapshot may be complete.

Figure 15:
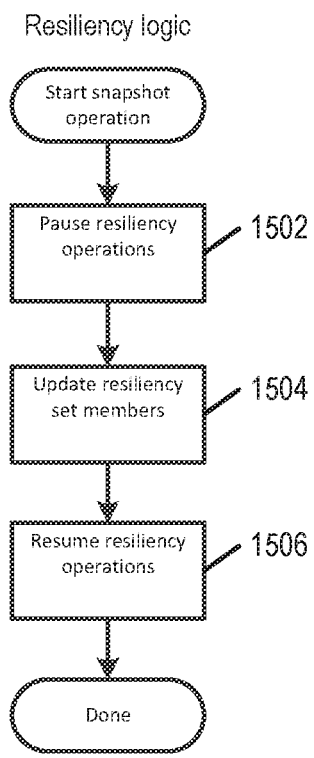
FIG. 15 illustrates an example asynchronous data resiliency system performing a data snapshot.

FIG. 15 illustrates an example asynchronous data resiliency system performing a data snapshot. The data snapshot may be triggered and/or requested by the application logic 314 and/or another logic. For example, the application logic 314 may request a data snapshot upon completing some amount of work, such as to establish a checkpoint of its progress as represented in the data of the resiliency set. Alternatively or in addition, the data snapshot may be triggered according to a schedule, such as periodically. Upon the data snapshot being triggered and/or requested, the resiliency logic 216 may pause (1502) processing asynchronous data resiliency operations.

Upon pausing (1502) processing asynchronous data resiliency operations, the resiliency logic 216 may update (1504) the resiliency set members. In updating (1504) the resiliency set members, the resiliency logic 216 may select one or more regions 214 of the resiliency set to be regions 214 of the snapshot resiliency set. Upon becoming regions 214 of the snapshot resiliency set, the selected regions 214 may no longer be members of the resiliency set. As such, subsequently processed asynchronous data resiliency operations may not act upon the selected regions.

Upon updating (1504) the resiliency set members, the resiliency logic 216 may resume (1506) processing asynchronous data resiliency operations. Upon resuming (1506) processing asynchronous data resiliency operations, performing the data snapshot may be complete.

Although specific steps are illustrated in FIG. 15, additional, fewer, or different steps may be included. For example, in examples where the data snapshot is requested by an asynchronous data resiliency operation and/or where asynchronous data resiliency operations are processed sequentially, steps (1502) and (1506) may be omitted. In addition, the steps may be performed in an order different than illustrated.

Certain logical relationships may be well suited to performing data snapshots with synchronous data resiliency and/or asynchronous data resiliency. For example, logical relationships with effective redundancy of at least 2 may be preferred. In these logical relationships, it may be possible to split the resiliency set into two smaller resiliency sets such that each smaller resiliency set can be used to access all of the data stored in the original resiliency set. Examples of logical relationships which may have effective redundancy of at least 2 are: mirroring logical relationships, RAID-1 logical relationships, RAID-10 logical relationships, erasure coding logical relationships, regenerative coding logical relationships, Maximum Distance Separable (MDS) codes, Minimum Storage Regenerating (MSR) codes, Minimum Bandwidth Regenerating (MBR) codes, Reed-Solomon codes, Erasure Coding-X (EC-X) codes, etc. In some examples, the resiliency logics 216 may perform additional operations on each of the two smaller resiliency sets to restore the performance and/or resiliency properties of the logical relationship.

The client 130, the memory appliance 110, and the management server 120 may be configured in any number of ways. In one example, the memory appliance 110 may be included in a computer. For example, the processor may be the CPU of the computer, the memory may be the memory of the computer, and the computer may include the communication interface 330. Alternatively or in addition, the memory appliance 110 may be a peripheral of a computer, including but not limited to a PCI device, a PCI-X device, a PCIe device, an HTX (HyperTransport eXpansion) device, or any other type of peripheral, internally or externally connected to a computer.

In a second example, the memory appliance 110 may be added to a computer or another type of computing device that accesses data in the memory appliance 110. For example, the memory appliance 110 may be a device installed in a computer, where the client 130 is a process executed by a CPU of the computer. The memory in the memory appliance 110 may be different than the memory accessed by the CPU of the computer. The processor in the memory appliance 110 may be different than the CPU of the computer.

In a third example, the memory appliance 110, the client 130, and/or the management server 120, may be implemented using a Non-Uniform Memory Architecture (NUMA). In NUMA, the processor may comprise multiple processor cores connected together via a switched fabric of point-to-point links. The memory controller may include multiple memory controllers. Each one of the memory controllers may be electrically coupled to a corresponding one or more of the processor cores. Alternatively, multiple memory controllers may be electrically coupled to each of the processor cores. Each one of the multiple memory controllers may service a different portion of the memory than the other memory controllers.

In a fourth example, the processor of the memory appliance 110, the client 130, and/or the management server 120 may include multiple processors that are electrically coupled to the interconnect, such as with a bus. Other components of the memory appliance 110, the client 130, and/or the management server 1202, such as multiple memories included in the memory, the communication interface, the memory controller, and the storage controller may also be electrically coupled to the interconnect.

In a fifth example, the external memory system may include multiple memory appliances, multiple regions, multiple region metadatas, multiple management servers, multiple external memory allocation metadatas, multiple region access logics, multiple observer logics, multiple resiliency logics, multiple data digesting logics, multiple allocation logics, multiple client logics, and/or multiple application logics.

In a sixth example, the client 130 may provide additional services to other systems and/or devices. For example, the client 130 may include a Network Attached Storage (NAS) appliance. Alternatively or in addition, the client 130 may include a Redundant Array of Independent Disks (RAID) head. Alternatively or in addition, the client 130 may provide file-level access to data stored in the memory appliance 110. Alternatively, or in addition, the client 130 may include a database, such as an in-memory database.

In a seventh example, multiple client logics, such as in multiple clients 130 may utilize one or more memory appliances 110 as shared memory. For example, the client logics 312 may include or interoperate with an application logic 314 that relies on massive parallelization and/or sharing of large data sets. Examples of application logic 314 that may use massive parallelization include logic that performs protein folding, genetic algorithms, seismic analysis, or any other computationally intensive algorithm and/or iterative calculations where each result is based on a prior result. The application logic 314 may store application data, application state, and/or checkpoint data in the regions 214 of the one or more memory appliances 110 and/or in an external memory allocation. The additional capabilities of the one or more memory appliances 110, such as low latency access and persistence to the backing store, may be exploited by the client logics 312 in order to protect against application crashes, a loss of power to the clients 130, or any other erroneous or unexpected event on any of clients 130. The client logics 312 may access the one or more memory appliances 110 in a way that provides for atomic access. For example, the client-side memory access operations requested by the clients 130 may include atomic operations, including but not limited to a fetch and add operation, a compare and swap operation, or any other atomic operation now known or later discovered. An atomic operation may be a combination of operations that execute as a group or that do not execute at all. The result of performing the combination of operations may be as if no operations other than the combination of operations executed between the first and last operations of the combination of operations. Thus, the clients 130 may safely access the one or more memory appliances 110 without causing data corruption. Multiple client logics 312 may perform the atomic operations in a consistent way. For example, the client logics 312 may direct all atomic operations to a designated region 214, such as the region 214 associated with the resiliency logic leader, and/or may direct all atomic operations to a designated communication interface 230 of the memory appliance 110. Upon completion of the atomic operation to a designated region 214 and/or communication interface 230, the client logic 312 may notify one or more observer logics 218 of a completed multi-write operation, indicating that the operation was only performed against the designated region 214.

The application logic 314, the client logic 312, the allocation logic 412, the observer logic 218, the region access logic 212, the resiliency logic 216, and/or the data digesting logic may be co-located, separated, or combined. The actions performed by combined logic may perform the same or similar feature as the aggregate of the features performed by the logics that are combined. In a first example, all five logics may be co-located in a single device. In a second example, the region access logic 212 and the observer logic 218 may be combined into a single logic. In a third example, the client logic 312 and the observer logic 218 may be combined into a single logic. In a fourth example, the client logic 312 and the region access logic 212 may be combined. In a fifth example, the observer logic 218 may be in a device different from the memory appliance 110, such as the management server 120 and/or a metadata server. A metadata server may be one or more hardware and/or software entities that may participate in the processing of operations, but may not directly handle the data stored in the memory appliance 110. The metadata server may track statistics, coordinate persistence, coordinate data duplication, and/or perform any other activity related to the memory access operations. In a sixth example, the region access logic 212 and the allocation logic 412 may be combined into a single logic. In a seventh example, the client logic 312 and the allocation logic 412 may be combined into a single logic. In an eighth example, the client logic 312 and the application logic 314 may be combined into a single logic. In a ninth example, the client logic 312 and the resiliency logic 216 may be combined into a single logic and/or the resiliency logic may perform one or more operations described for the client logic. Other combinations of the various components are possible, just a few of which are described here.

The application logic 314, the client logic 312, the allocation logic 412, the observer logic 218, the region access logic 212, the resiliency logic 216, and/or the data digesting logic may include computer code. The computer code may include instructions executable with the processor. The computer code may be written in any computer language now known or later discovered, such as C, C++, C#, Java, or any combination thereof. In one example, the computer code may be firmware. Alternatively or in addition, all or a portion of the application logic 314, the client logic 312, the allocation logic 412, the observer logic 218, the region access logic 212, the resiliency logic 216, the data digesting logic and/or the processor may be implemented as a circuit. For example, the circuit may include an FPGA (Field Programmable Gate Array) configured to perform the features of the application logic 314, the client logic 312, the allocation logic 412, the observer logic 218, the region access logic 212, the resiliency logic 216, and/or the data digesting logic. Alternatively, or in addition, the circuit may include an ASIC (Application Specific Integrated Circuit) configured to perform the features of the application logic 314, the client logic 312, the allocation logic 412, the observer logic 218, the region access logic 212, the resiliency logic 216, and/or the data digesting logic. The circuit may be embedded in a chipset, a processor, and/or any other hardware device.

Alternatively, or in addition, a portion of the application logic 312, the client logic 312, the allocation logic 412, the observer logic 218, the region access logic 212, the resiliency logic 216, the data digesting logic, and/or the processor may be implemented as part of the one or more communication interfaces or other hardware component. For example, the one or more communication interfaces or other hardware component may modify a portion of the memory when a write operation is performed. The observer logic 218 may periodically check the portion of memory and may take further action based on the contents of the portion and the region associated with the portion. The further action may include determining statistics related to the operations that are being and/or were performed, identifying portions that are being and/or have been written to and/or read from, persisting the contents of the portions to the backing store 260, duplicating the contents of the portions to a different region, a different memory appliance, an external server, and/or a backup device, and/or taking any other action related to the operations. In another example, all of or a portion of the resiliency logic 216 may be included in the communication interface 230, such as by executing it with a processor and/or co-processor of the communication interface 230. In another example, all of or a portion of the client logic 312 may be included in the communication interface 330, such as by executing it with a processor and/or co-processor of the communication interface 330.

The system may be implemented in many different ways. Each module or unit, such as the client logic unit, the region access unit, the allocation logic unit, the configuration unit, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 210, for example, that comprises instructions executable with the processor 240 or other processor to implement one or more of the features of the module. When any one of the module includes the portion of the memory that comprises instructions executable with the processor, the module may or may not include the processor. In some examples, each module may just be the portion of the memory 210 or other physical memory that comprises instructions executable with the processor 240 or other processor to implement the features of the corresponding module without the module including any other hardware. Because each module includes at least some hardware even when the included hardware comprises software, each module may be interchangeably referred to as a hardware module.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed throughout this disclosure may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code, or any type of other processor, operating alone or in combination. Likewise, processing strategies may include multiprocessing, multitasking, parallel processing and/or any other processing strategy known now or later discovered. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, CPU, GPU, or system.

In one example, a client device may write a first data over a network via client-side memory access to a first region of memory of a first memory appliance in response to a write operation, wherein the first data is derived from data of the write operation, wherein the first region of memory is external primary memory to the client device, and wherein a first communication interface of the first memory appliance is configured to access the first region of memory on the first memory appliance for any client-side memory access of the first region of memory. The client device may write, via client-side memory access, a second data to a second region of memory of a second memory appliance, wherein the second data is derived from the data of the write operation, wherein the second region of memory is external memory to the client device, wherein a resiliency set comprises a plurality of memory regions including the first region of memory and the second region of memory, and wherein data of the write operation is recoverable from a subset of the memory regions, the subset excluding the first region of memory or the second region of memory.

The data of the write operation may be data written to one or more locations of primary memory. For example, an application may allocate memory by an operating system memory allocation call and then write to the allocated memory. The first data and the second data may be derived from data of write operation. In a simple example, the first data and the second data may each be a copy of the data of the write operation. In some examples, the first data and the second data may include additional information such as parity information or any other error checking information. Alternatively or in addition, the data of the write operation may be spread across the first data, the second data, and/or other data written to other memory regions of the resiliency set.

In some examples, said writing to the first region of memory completes before said writing to the second region of memory starts. In alternative examples, said writing to the first region of memory and said writing to the second region of memory are performed in parallel. In some examples, the client device may wait until the data of the write operation is written to the first region of memory and the second region of memory before completing the write operation.

In some examples, said writing to the first region of memory triggers a page fault with the communication interface of the first memory appliance and a corresponding page fault hander completes handling of the page fault after waiting for one or more conflicting resiliency rebuild operations to finish.

In some examples, the client device may transmit a notification message to a second client device, wherein the data of the write operation is written to a third region of memory of a third memory appliance in response to the notification message, the third region of memory included in the memory regions of the resiliency set.

A computer readable storage medium may be provided that comprises computer executable instructions, the computer executable instructions executable by a processor. The computer executable instructions may comprise: instructions executable to write data from a first client device to a first region of memory of a first memory appliance via client-side memory access in response to a write operation received at the first client device, wherein the first region of memory is external primary memory to the first client device, and wherein a first communication interface of the first memory appliance is configured to access the first region of memory on the first memory appliance for any client-side memory access of the first region of memory; and instructions executable to transmit a notification message to a second client device and/or a second memory appliance, the notification message indicating the data of the write operation is to be written to a second region of memory of the second memory appliance, wherein the second region of memory is external primary memory to the first client device or the second client device, wherein a resiliency set comprises a plurality of memory regions including the first region of memory and the second region of memory, and wherein data of the write operation is recoverable from a subset of the memory regions, the subset excluding the first region of memory or the second region of memory.

In some examples, the notification message identifies the data of the write operation. Alternatively or in addition, the computer readable storage medium may further comprising instructions executable to form a snapshot of primary memory by removal of a memory region from the resiliency set, wherein the snapshot includes contents of the memory region removed from the resiliency set. In some examples, the computer readable storage medium may further comprise instructions executable to wait for conflicting operations to complete upon notification of start of the snapshot.

A relationship between the memory regions of the resiliency set may be that each of the memory regions includes a corresponding copy of data common to all of the memory regions. For example, the client device, or the resiliency logic cluster more generally, may attempt to keep the data the memory regions consistent across the memory regions. In other words, data written to one of the memory regions may be written to the other memory regions. In a different example, the relationship between the memory regions of the resiliency set may be a partial data redundancy. In other words, data of the write operation may be spread out across N memory regions in such a way that the data of the write operation may be recovered from at least M memory regions, where M is less than N. In one such example, the relationship between the memory regions of the resiliency set is an erasure-coding-based logical relationship.

The computer readable storage medium my include instructions executable to form a resiliency logic cluster that identifies a logical cluster of resiliency logics corresponding to the memory regions of the resiliency set.

A client device may be provided that includes a processor that is configured to: write data to a first region of memory on a first memory appliance in response to a write operation, wherein the first region of memory is external memory to the client device, and wherein the first region of memory is accessible by the client device over a network via client-side memory access in which a first communication interface of the first memory appliance is configured to access the first region of memory on the first memory appliance; and cause the data of the write operation to be written to a second region of memory on a second memory appliance, wherein a resiliency set comprises a plurality of memory regions including the first region of memory and the second region of memory, and wherein the data of the write operation is recoverable from a subset of the memory regions, the subset excluding the first region of memory or the second region of memory.

For example, the processor may be configured to write the data of the write operation to the second region of memory on the second memory appliance via client-side memory access. Alternatively, the processor may be configured to transmit a notification message over the network to the second memory appliance and/or a second client device, in response to which, the data of the write operation is written to the second region of memory on the second memory appliance.

The processor may be configured to form a snapshot of memory by removal of a memory region from the resiliency set, wherein the snapshot includes contents of the memory region removed from the resiliency set.

In some examples, the processor is configured to notify an observer logic for the second region of memory that a multi-write is upcoming, and to notify the observer logic if the multi-write completes.

The processor may be configured to rebuild resiliency of the memory regions in the resiliency set asynchronously of the write operation.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A method comprising:
   writing, by a client device over a network via client-side memory access, a first data to a first region of memory of a first memory appliance in response to a write operation, wherein the first data is derived from data of the write operation, wherein the first region of memory is external primary memory, which is primary memory to the client device but external to the client device, wherein the client comprises a processor, wherein primary memory is any memory in an address space addressable by the processor, and wherein a first communication interface of the first memory appliance is configured to access the first region of memory on the first memory appliance for any client-side memory access of the first region of memory; and
   writing, by the client device via client-side memory access, a second data to a second region of memory of a second memory appliance, wherein the second data is derived from the data of the write operation, wherein the second region of memory is external primary memory to the client device, wherein a resiliency set comprises a plurality of memory regions including the first region of memory and the second region of memory, and wherein the data of the write operation is recoverable from a subset of the memory regions, the subset excluding the first region of memory or the second region of memory.

2. The method of claim 1, wherein said writing to the first region of memory completes before said writing to the second region of memory starts.

3. The method of claim 1, wherein said writing to the first region of memory and said writing to the second region of memory are performed in parallel.

4. The method of claim 1 further comprising waiting until the first data and the second data are written to the first region of memory and the second region of memory, respectively, before completing the write operation.

5. The method of claim 1, wherein said writing to the first region of memory triggers a page fault with the communication interface of the first memory appliance and a corresponding page fault hander completes handling of the page fault after waiting for one or more conflicting resiliency rebuild operations to finish.

6. The method of claim 1 further comprising transmitting a notification message from the client device to a second client device, wherein a third data is written to a third region of memory of a third memory appliance in response to the notification message, the third data derived from the data of the write operation, the third region of memory included in the memory regions of the resiliency set.

7. A non-transitory computer readable storage medium comprising computer executable instructions, the computer executable instructions executable by a processor, the computer executable instructions comprising:
  instructions executable to write a first data from a first client device to a first region of memory of a first memory appliance via client-side memory access in response to a write operation received at the first client device, wherein the first data is derived from data of the write operation, wherein the first region of memory is external primary memory, which is allocatable as primary memory of the first client device but is external to the first client device, wherein primary memory is any memory in an address space addressable by the processor, and wherein a first communication interface of the first memory appliance is configured to access the first region of memory on the first memory appliance for any client-side memory access of the first region of memory; and
  instructions executable to transmit a notification message to a second client device and/or a second memory appliance, the notification message indicating a second data is to be written to a second region of memory of the second memory appliance, wherein the second data is derived from the data of the write operation, wherein the second region of memory is external primary memory, which is allocatable as primary memory of the first client device or the second client device but is external to the first client device and the second client device, wherein a resiliency set comprises a plurality of memory regions including the first region of memory and the second region of memory, and wherein the data of the write operation is recoverable from a subset of the memory regions, the subset excluding the first region of memory or the second region of memory.

8. The non-transitory computer readable storage medium of claim 7, wherein the notification message identifies the second data.

9. The non-transitory computer readable storage medium of claim 7 further comprising instructions executable to form a snapshot of primary memory by removal of a memory region from the resiliency set, wherein the snapshot includes contents of the memory region removed from the resiliency set.

10. The non-transitory computer readable storage medium of claim 9 further comprising instructions executable to wait for conflicting operations to complete upon notification of a start of the snapshot.

11. The non-transitory computer readable storage medium of claim 7, wherein a relationship between the memory regions of the resiliency set is that each of the memory regions includes a corresponding copy of data common to all of the memory regions, and wherein the first data is the same as the second data, and the data of the write operation is included in the first data and the second data.

12. The non-transitory computer readable storage medium of claim 7, wherein a relationship between the memory regions of the resiliency set is a partial data redundancy.

13. The non-transitory computer readable storage medium of claim 7, wherein a relationship between the memory regions of the resiliency set is an erasure-coding-based logical relationship.

14. The non-transitory computer readable storage medium of claim 7 further comprising instructions executable to form a resiliency logic cluster that identifies a logical cluster of resiliency logics corresponding to the memory regions of the resiliency set.

15. A client device comprising:
  a processor configured to:
  write a first data to a first region of memory on a first memory appliance in response to a write operation, wherein the first data is derived from data of the write operation, wherein the first region of memory is external primary memory to the client device, wherein primary memory is any memory in an address space addressable by the processor and wherein the first region of memory is accessible by the client device over a network via client-side memory access in which a first communication interface of the first memory appliance is configured to access the first region of memory on the first memory appliance; and
  cause a second data to be written to a second region of memory on a second memory appliance, wherein the second data is derived from the data of the write operation, wherein a resiliency set comprises a plurality of memory regions including the first region of memory and the second region of memory, and wherein the data of the write operation is recoverable from a subset of the memory regions, the subset excluding the first region of memory or the second region of memory.

16. The client device of claim 15, wherein the processor is configured to write the second data to the second region of memory on the second memory appliance via client-side memory access.

17. The client device of claim 15, wherein the processor is configured to transmit a notification message over the network to the first memory appliance, the second memory appliance, and/or a second client device, in response to which, the second data is written to the second region of memory on the second memory appliance.

18. The client device of claim 17, wherein the processor is configured to form a snapshot of memory by removal of a memory region from the resiliency set, wherein the snapshot includes contents of the memory region removed from the resiliency set.

19. The client device of claim 15, wherein the processor is configured to notify an observer logic for the second region of memory that a multi-write is upcoming, and to notify the observer logic if the multi-write completes.

20. The client device of claim 15, wherein the processor is configured to rebuild resiliency of the memory regions in the resiliency set asynchronously of the write operation.

* * * * *